United States Patent
Baldo

(10) Patent No.: US 9,486,102 B2
(45) Date of Patent: Nov. 8, 2016

(54) BREWING UNIT WITH HORIZONTAL MOTION

(75) Inventor: Massimo Baldo, Quintno de Treviso (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 640 days.

(21) Appl. No.: 13/820,759

(22) PCT Filed: Oct. 5, 2011

(86) PCT No.: PCT/IB2011/054375
§ 371 (c)(1),
(2), (4) Date: Mar. 5, 2013

(87) PCT Pub. No.: WO2012/046195
PCT Pub. Date: Apr. 12, 2012

(65) Prior Publication Data
US 2013/0239820 A1    Sep. 19, 2013

(30) Foreign Application Priority Data

Oct. 8, 2010  (EP) .................................... 10186948
Jul. 8, 2011  (EP) .................................... 11173201

(51) Int. Cl.
*A47J 31/06*    (2006.01)
*A47J 31/40*    (2006.01)
*A47J 31/36*    (2006.01)

(52) U.S. Cl.
CPC ............ *A47J 31/407* (2013.01); *A47J 31/369* (2013.01); *A47J 31/3633* (2013.01); *A47J 31/3638* (2013.01)

(58) Field of Classification Search
CPC ... A47J 31/3633; A47J 31/407; A47J 31/369
USPC .......... 99/275–323, 495, 516, 536, 452–455; 426/425, 433, 435, 416, 115, 231, 426/77–79, 82, 84, 112, 394
See application file for complete search history.

(56) References Cited

U.S. PATENT DOCUMENTS

| | | | |
|---|---|---|---|
| 3,295,998 A | 1/1967 | Goros | |
| 2007/0221066 A1* | 9/2007 | Sullivan | A47J 31/3695 99/279 |
| 2010/0224077 A1* | 9/2010 | Jing | A47J 31/3638 99/295 |
| 2012/0000371 A1* | 1/2012 | Blanchino | A47J 31/3638 99/295 |

FOREIGN PATENT DOCUMENTS

| | | |
|---|---|---|
| EP | 2283755 A2 | 2/2011 |
| WO | 2010103044 A1 | 9/2010 |

* cited by examiner

*Primary Examiner* — Phuong Nguyen

(57) ABSTRACT

A brewing unit including a first brewing chamber portion and a second brewing chamber portion; a channel for inserting capsules towards said brewing chamber; a mobile deviator interposing between said first brewing chamber portion and said second brewing chamber portion when said first brewing chamber portion and second brewing chamber portion are open, to deviate said capsules towards one of said first and second brewing chamber portions; an actuation mechanism for closing and opening said brewing chamber, wherein said actuation mechanism is connected to open and close said brewing chamber; said actuation mechanism is further connected to said mobile deviator such that said actuation mechanism controls said mobile deviator to remove said mobile deviator from a trajectory of mutual motion of said first and second brewing chamber portions during closure of the brewing chamber.

18 Claims, 30 Drawing Sheets

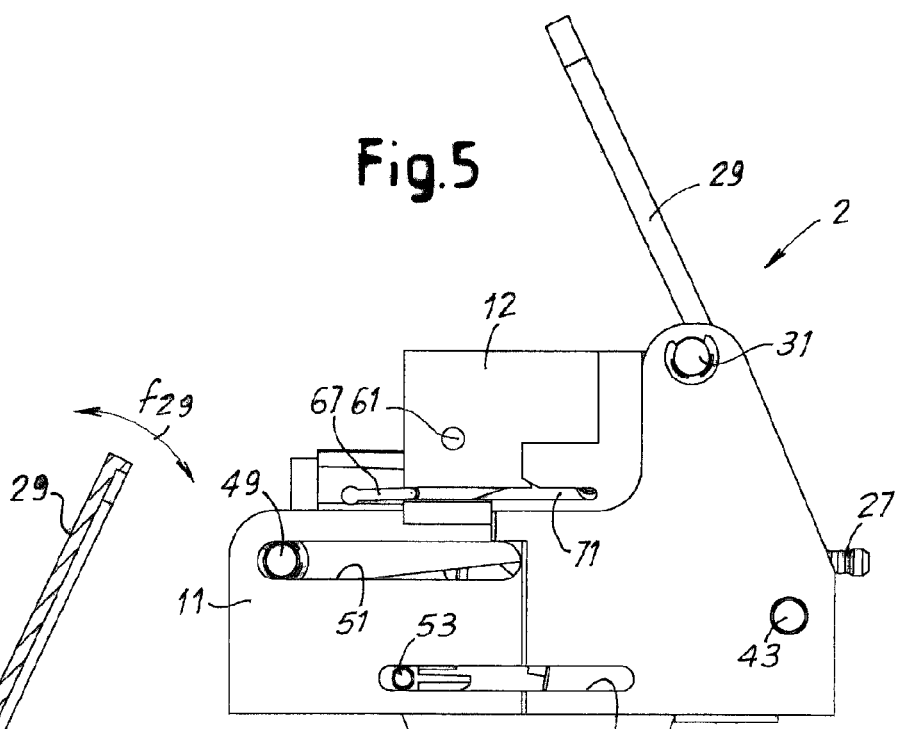
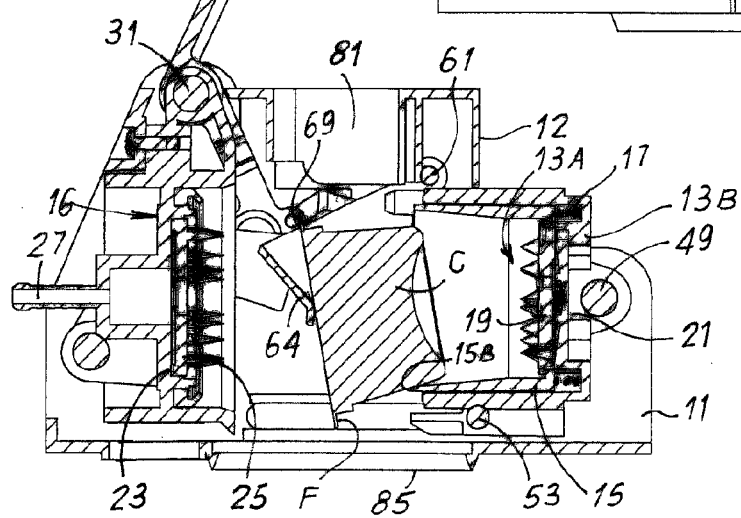
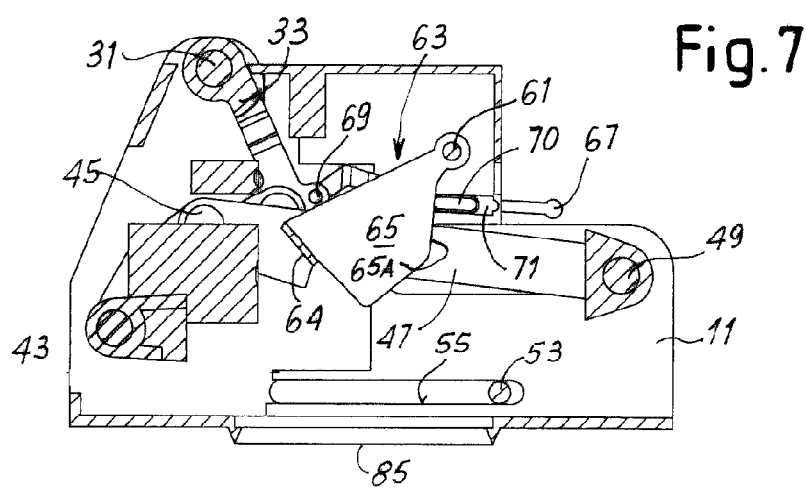

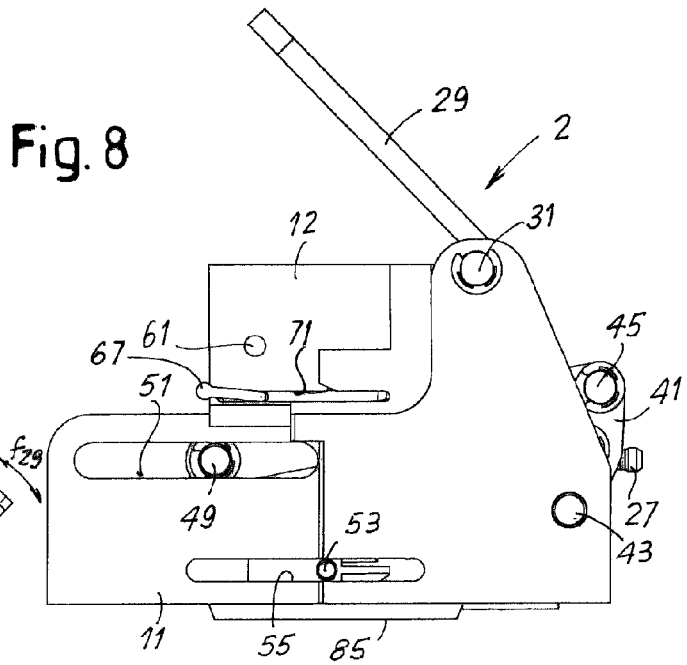
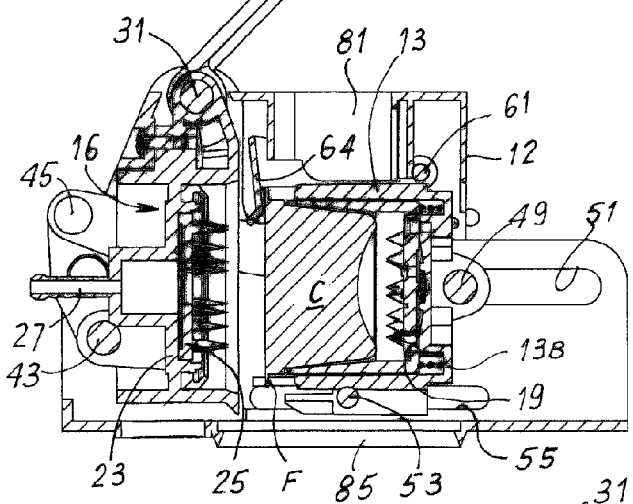
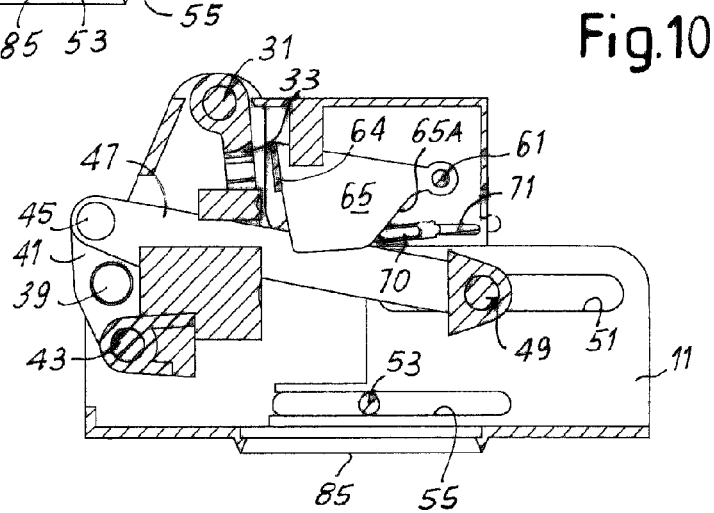

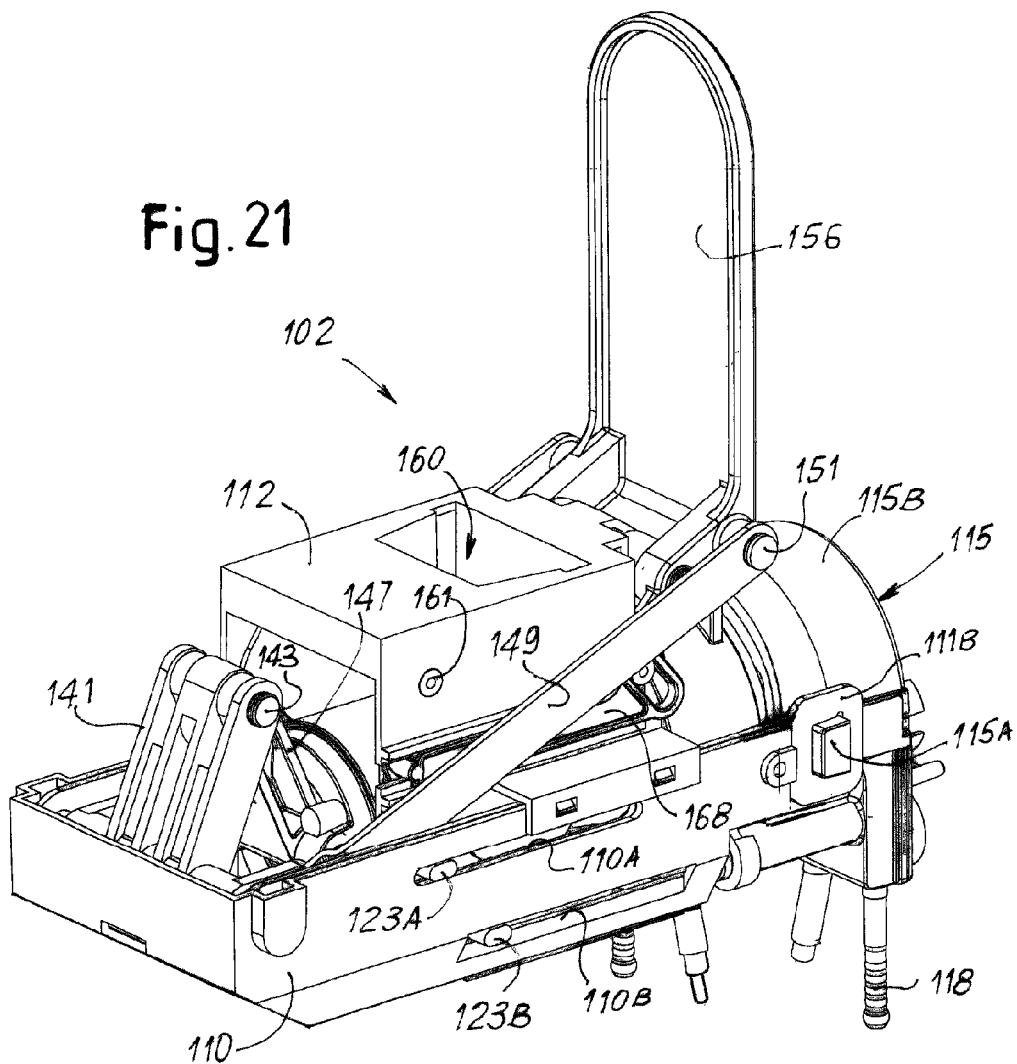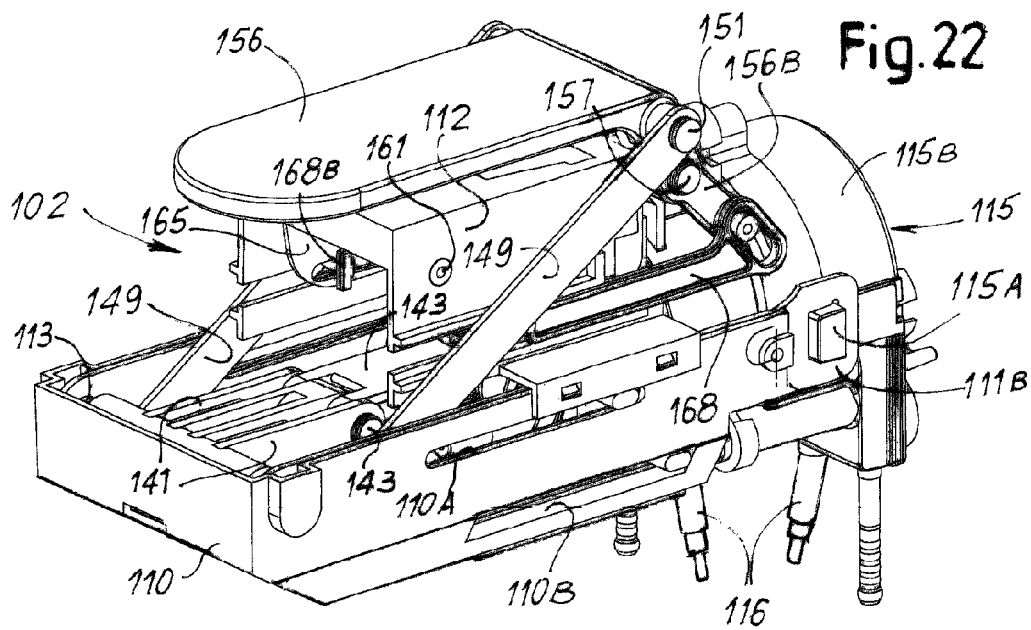

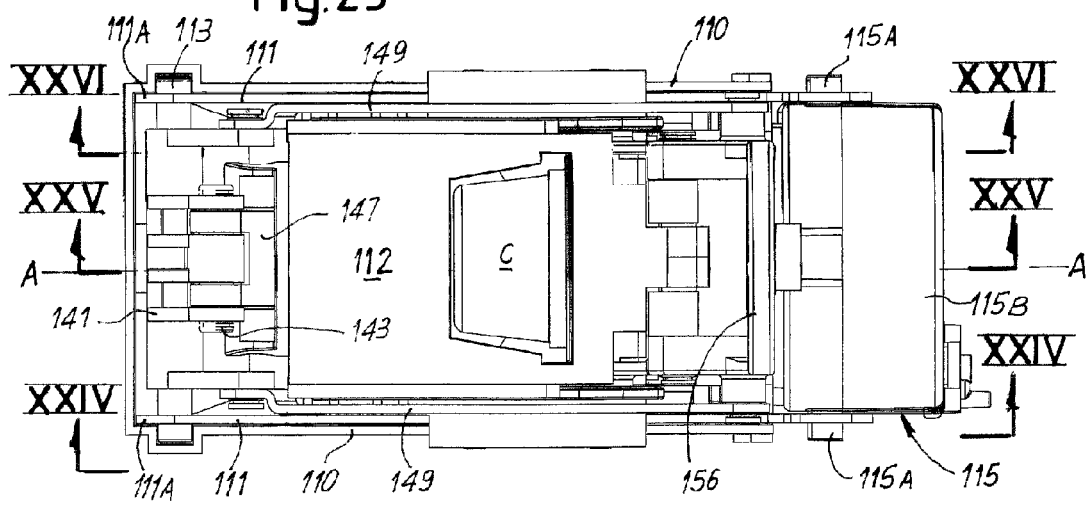
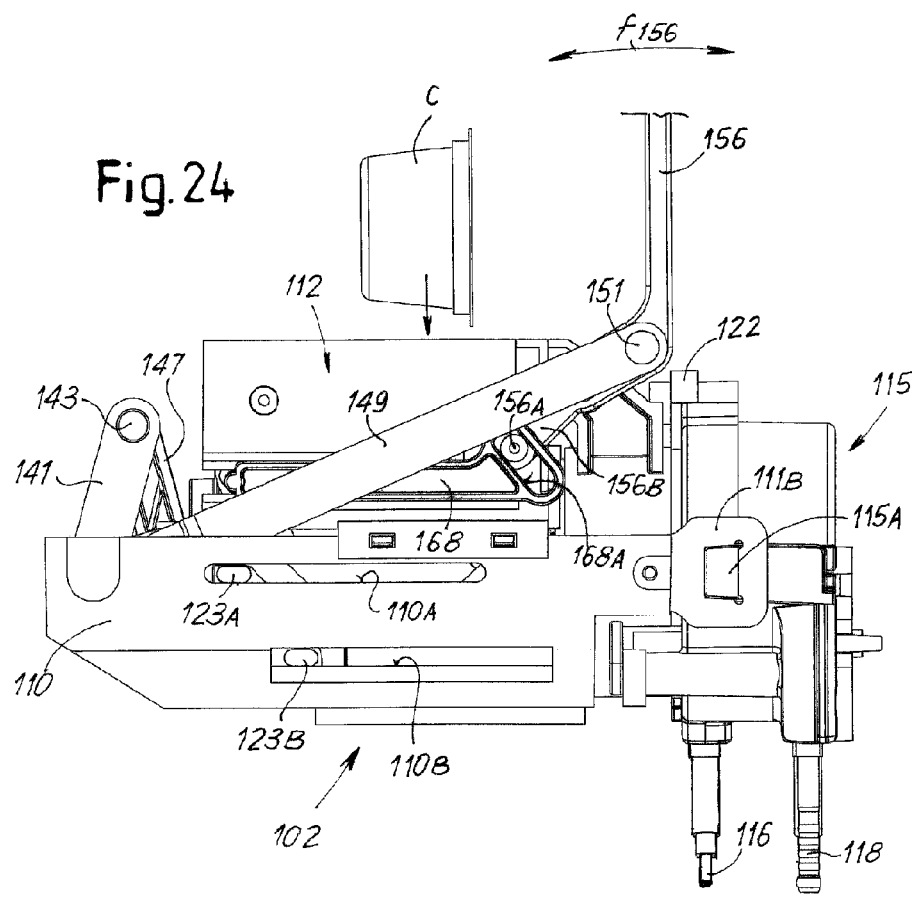

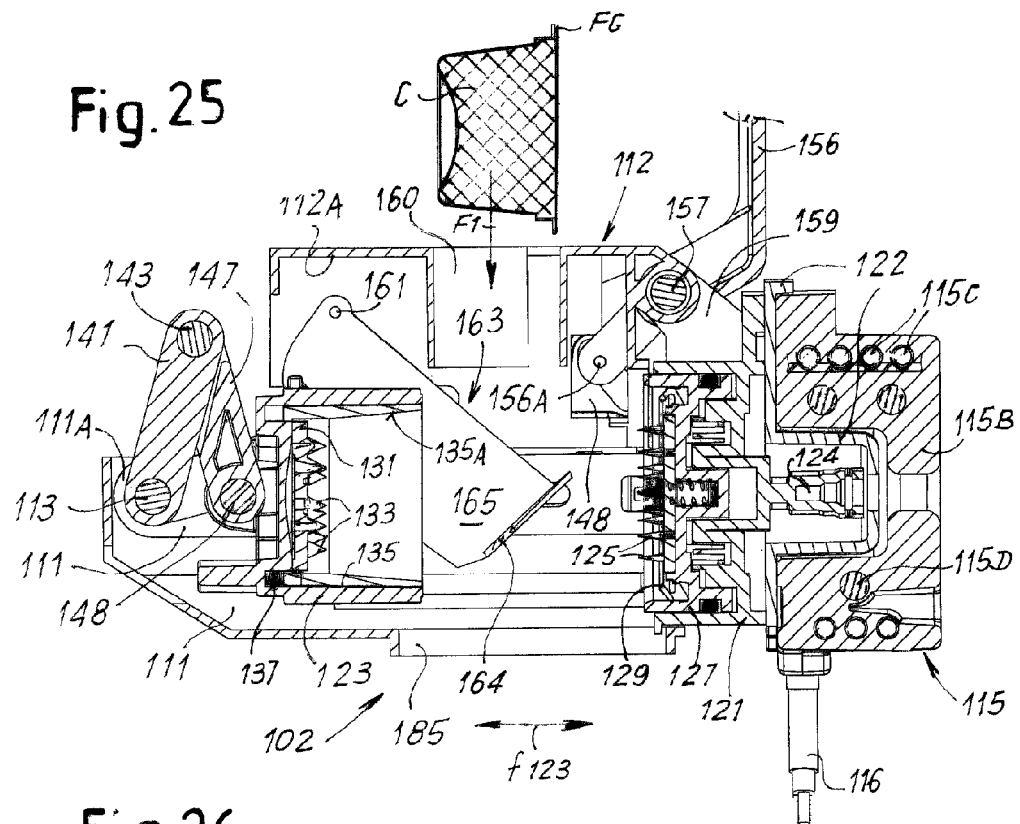
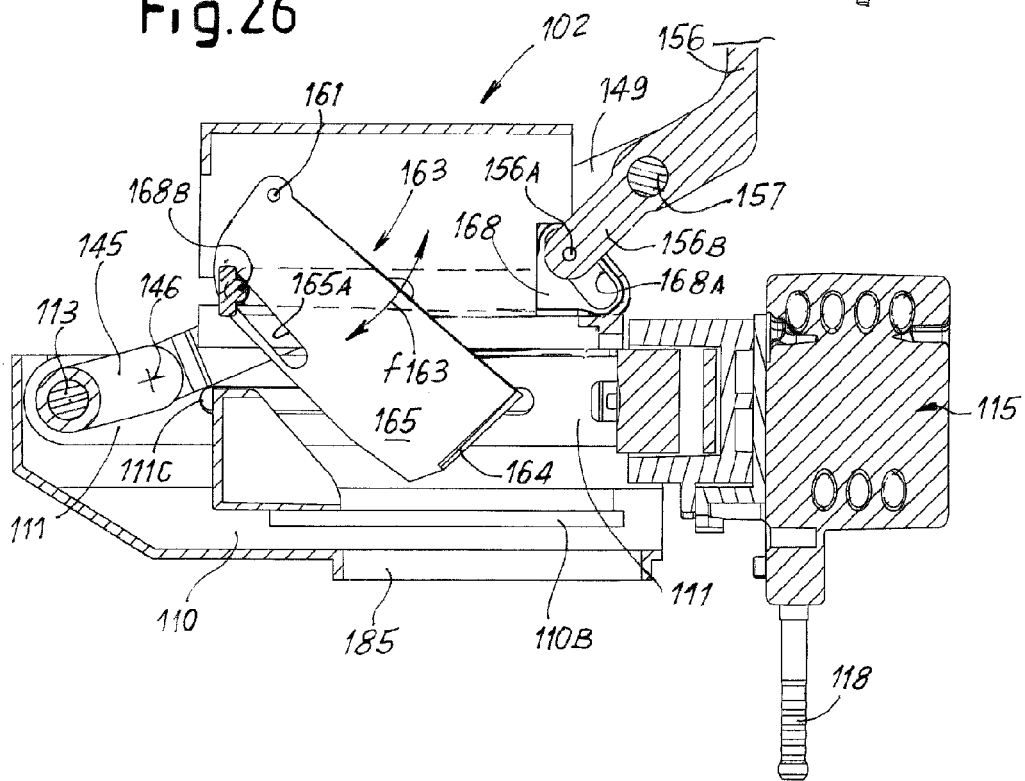

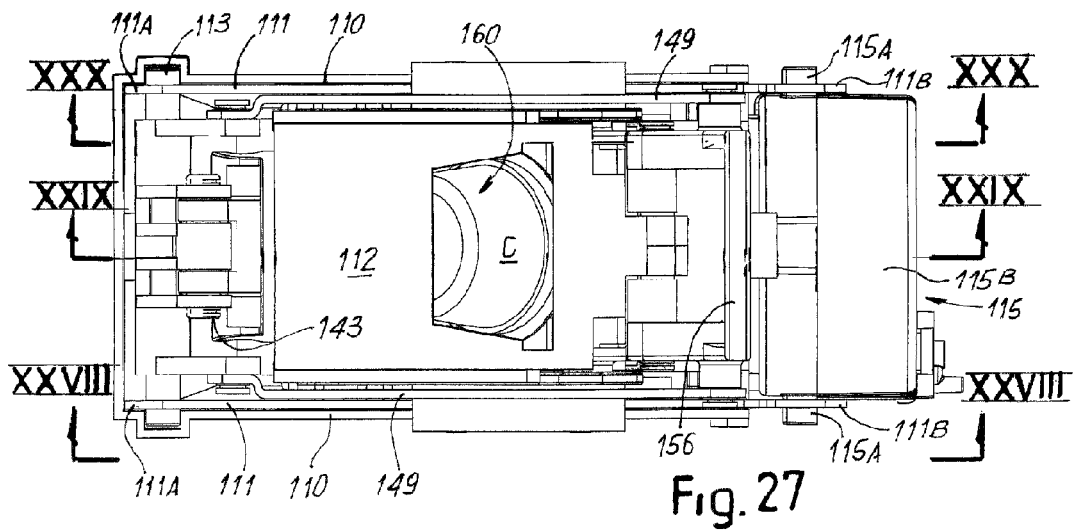
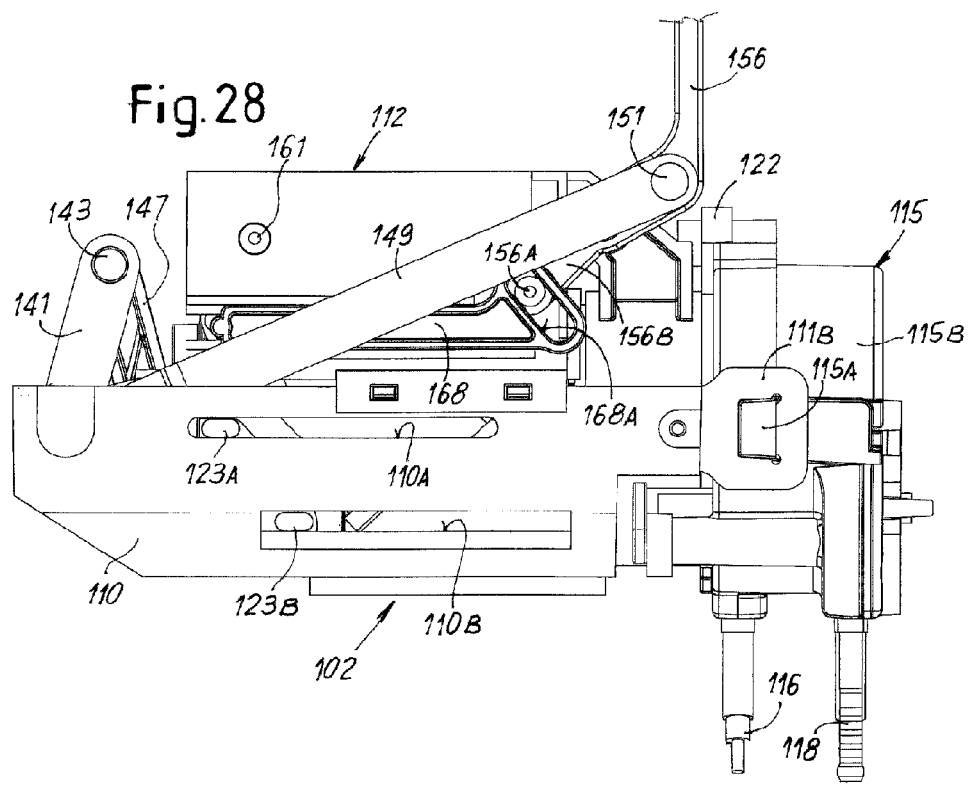

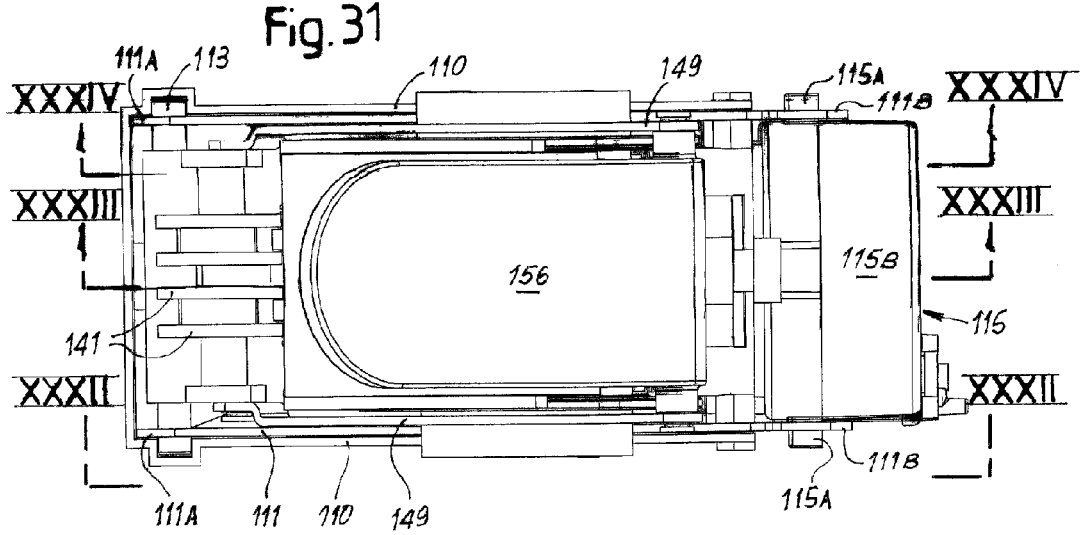
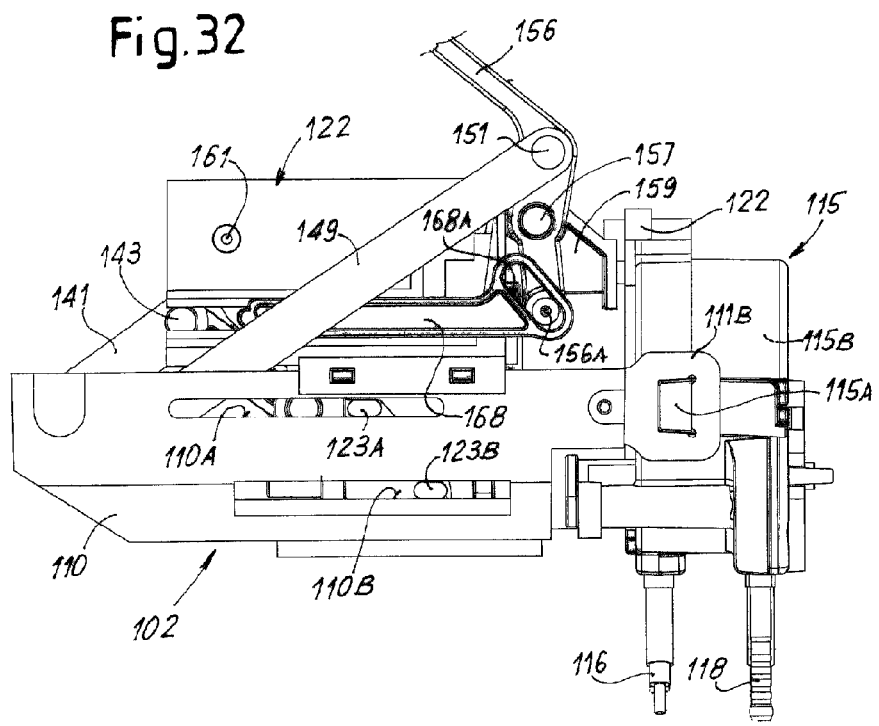

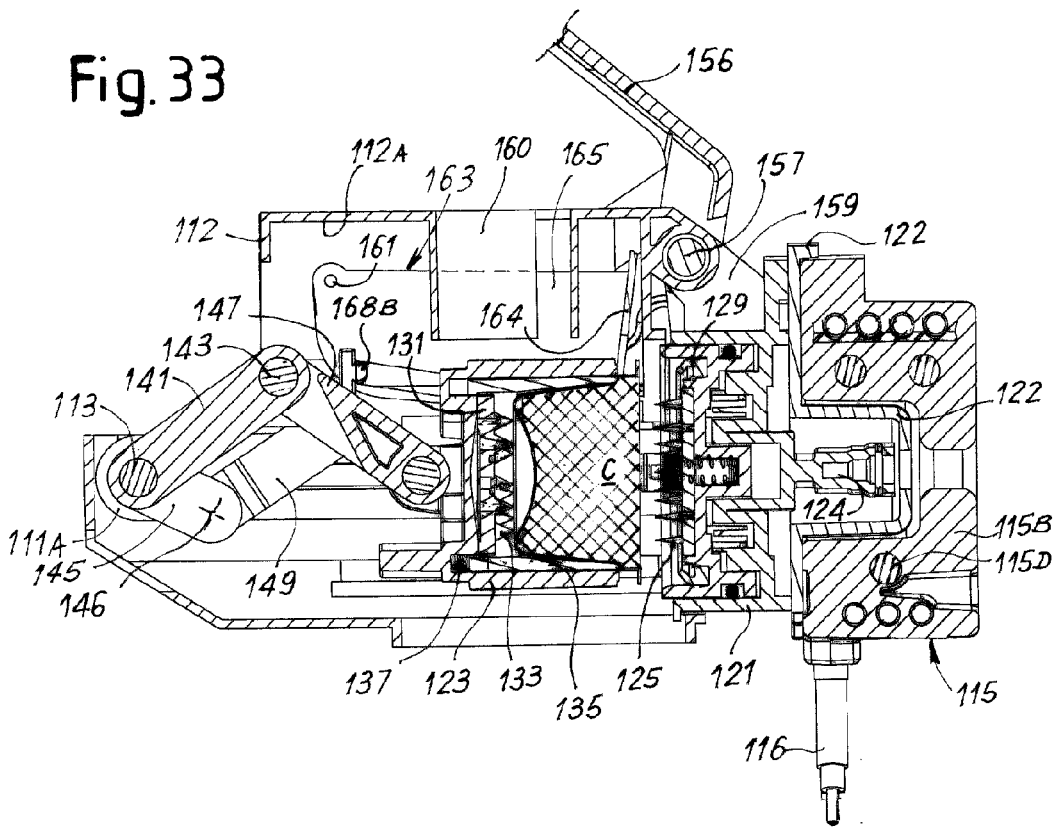
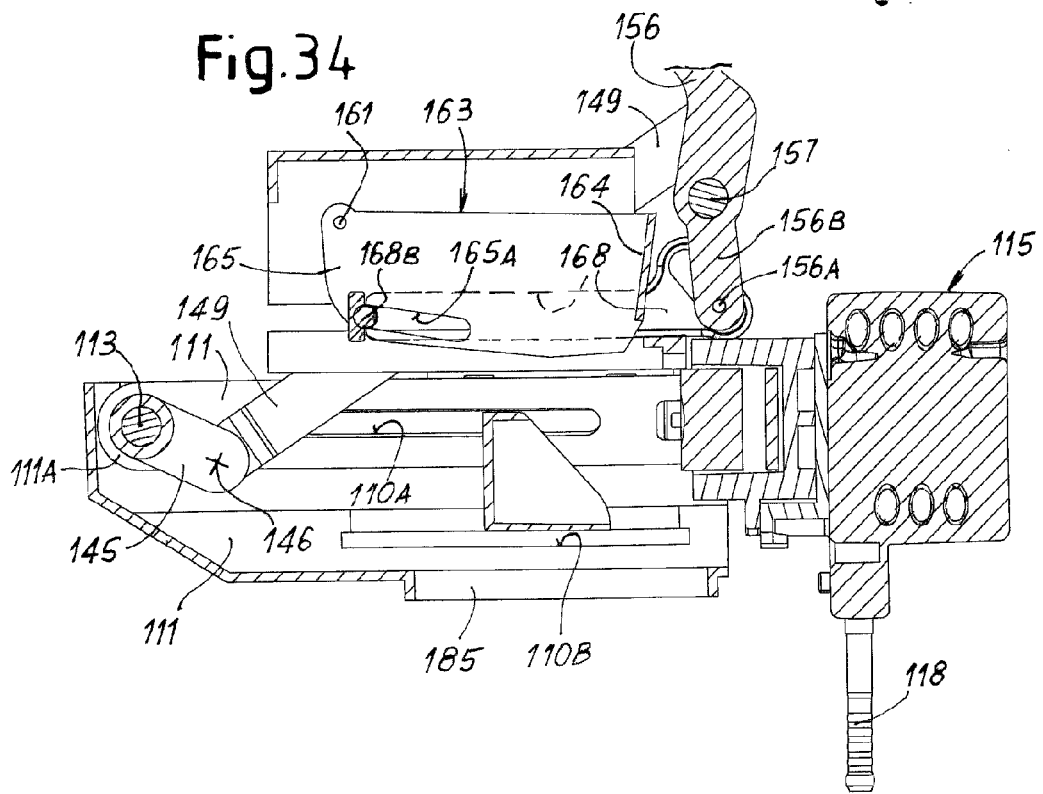

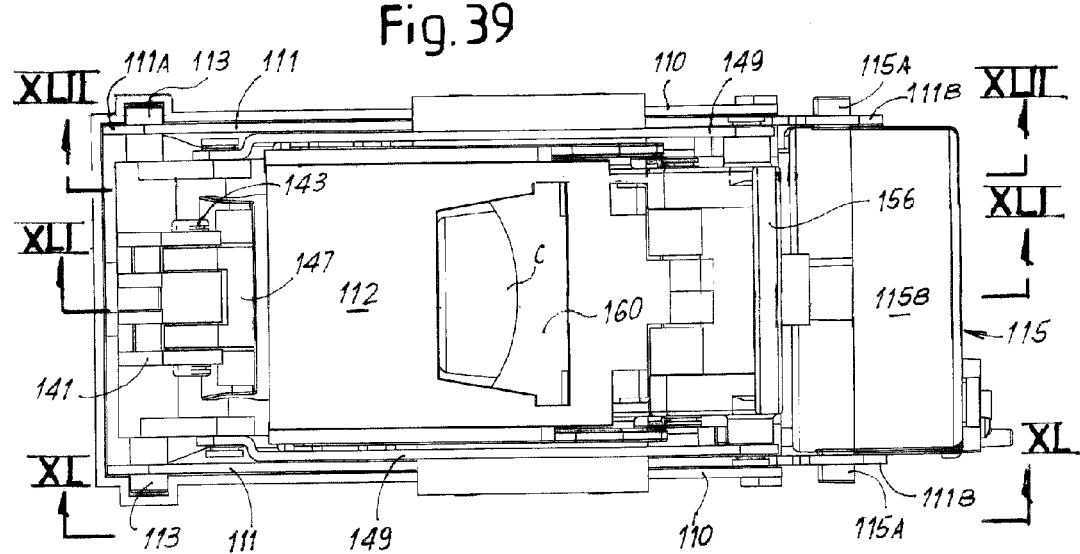
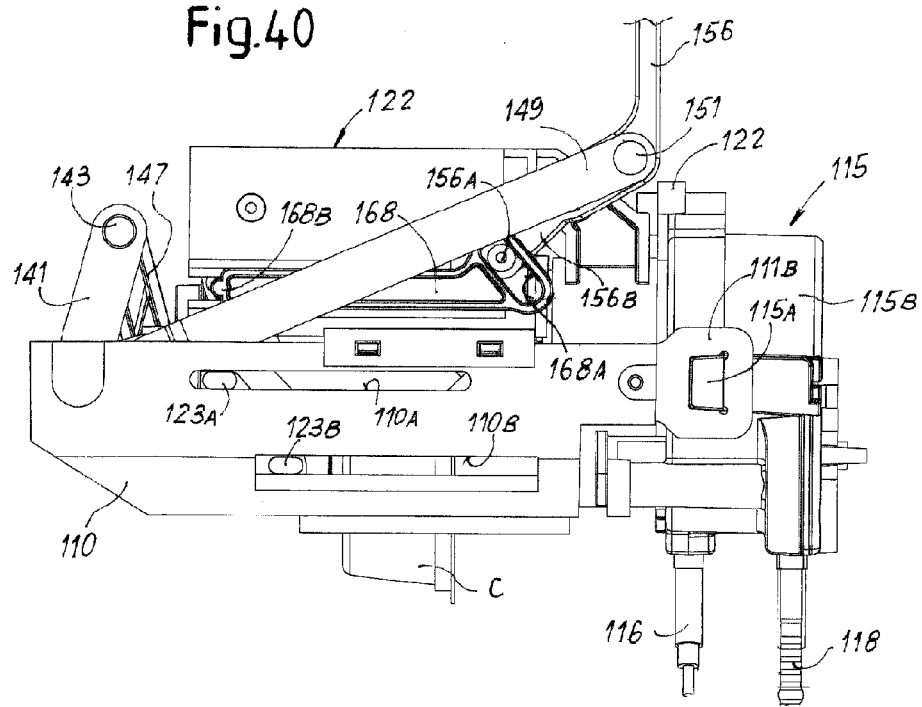

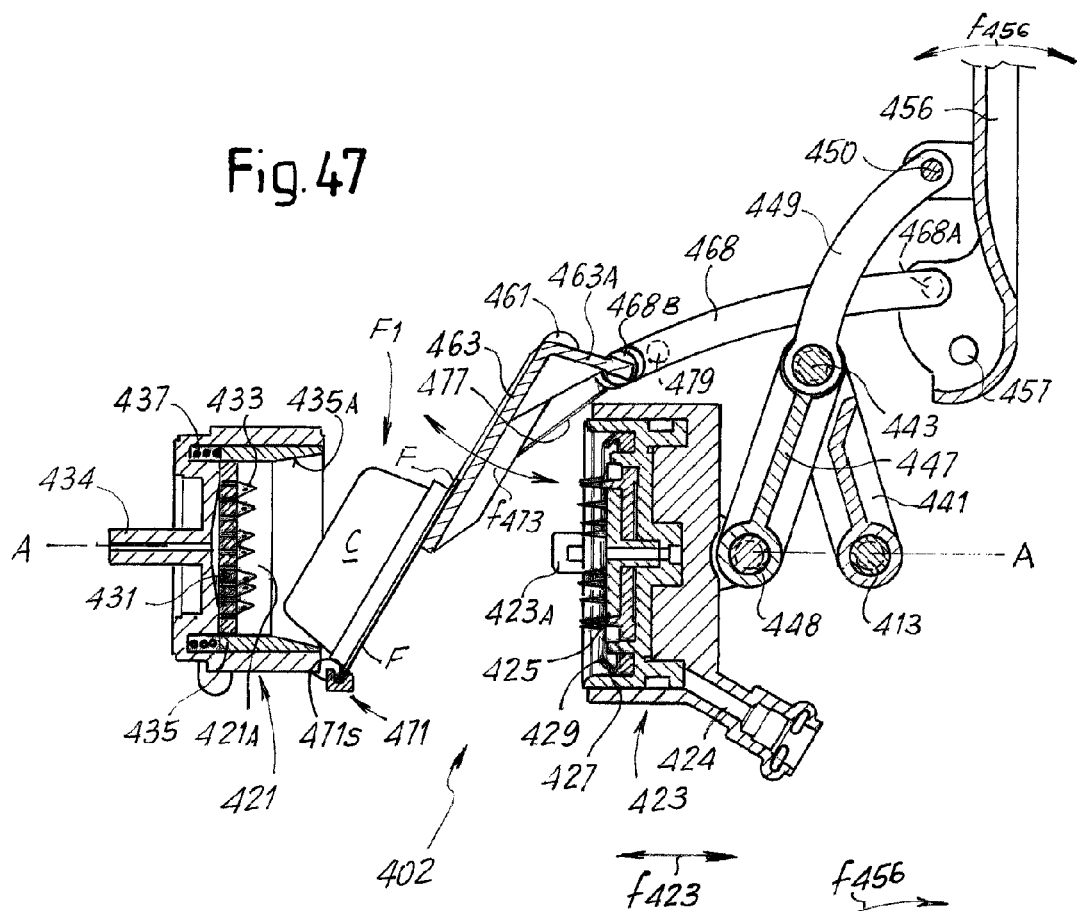

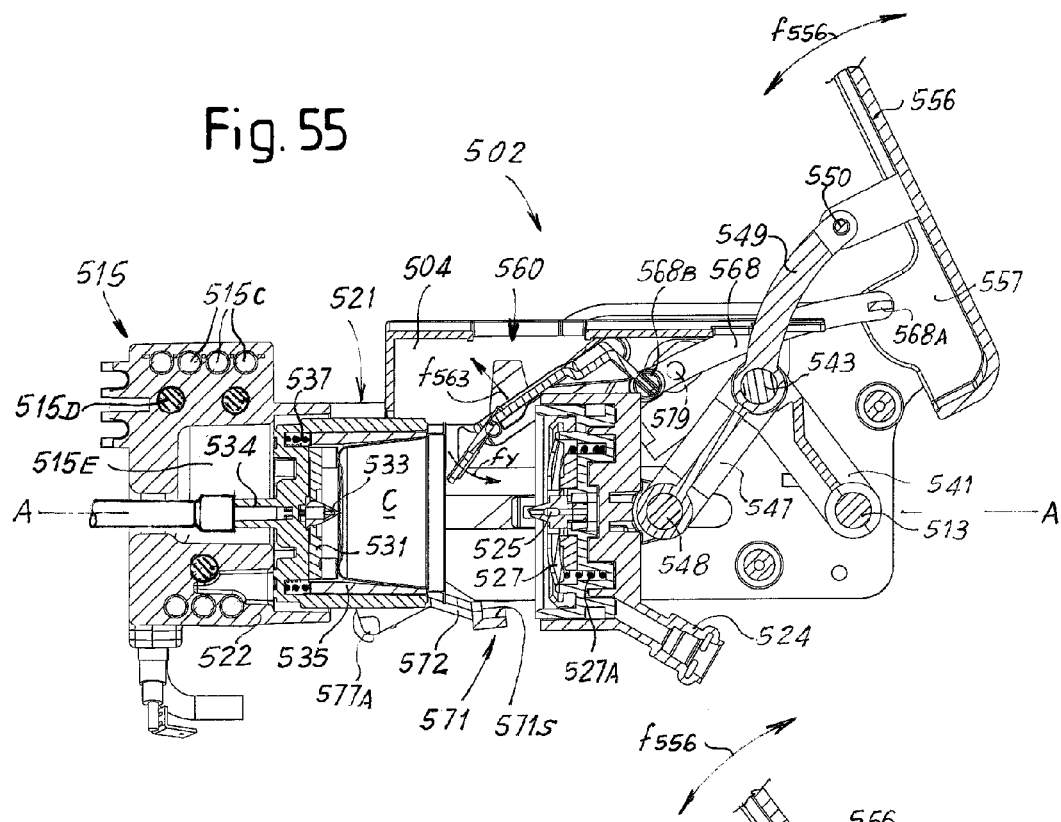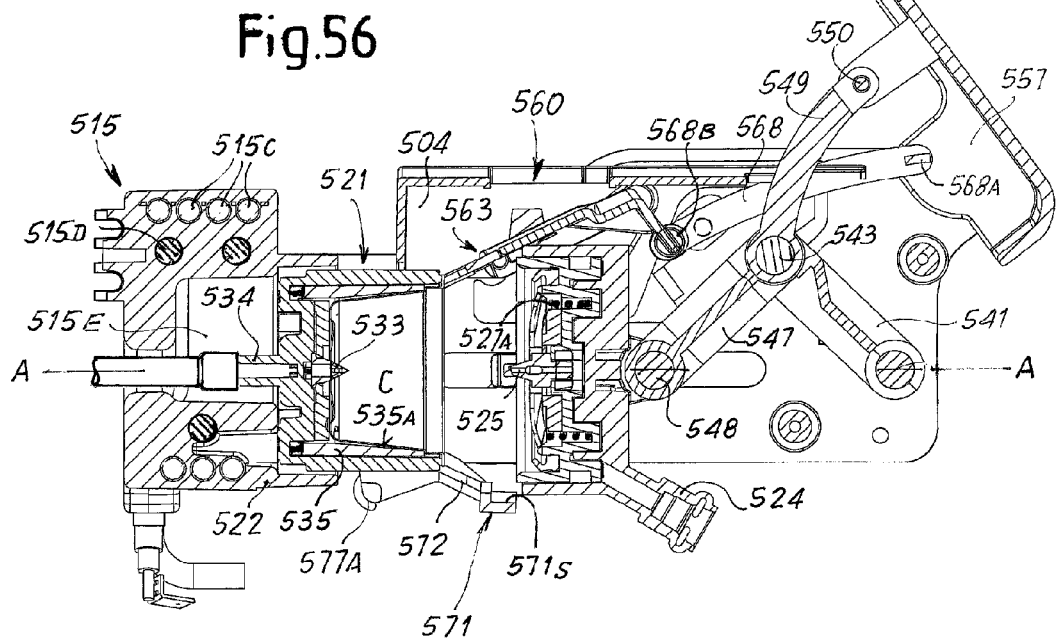

BREWING UNIT WITH HORIZONTAL MOTION

TECHNICAL FIELD

The present invention relates to a brewing unit for producing beverages from pre-packed capsules, for example but not exclusively for producing coffee.

STATE OF ART

For producing hot beverages, such as for example coffee, tea, vegetable-based infusions and the like, single-dose packagings, the so-called capsules, are often used, containing the ingredients for producing the beverage, therethrough hot water is made to flow at an adequate pressure to extract the flavours from the ingredients contained in the capsule. There are several types of devices for manipulating the capsules and for the infusion, that is for the phase for extracting the flavours from the capsules through water passage.

In US-2010101428 and in US-2010037779 brewing units are described using single-dose capsules, wherein the capsules are inserted vertically by falling inside an insertion channel towards a brewing chamber constituted by two portions mobile one with respect to the other one which open to receive a capsule and close to follow the infusion cycle. In these known devices a system is provided for keeping the capsule inserted in the brewing unit before closing the brewing chamber. More in particular, a pair of elastic arms placed on the sides of the opening and closing route of the two portions of the brewing chamber engage the capsule at the flange thereof when it is inserted in a position between the two opened portions of the brewing chamber. The arms follow the motion of the mobile portion of the brewing chamber and accompany the capsule inside the fixed portion. Once ended the phase for extracting the beverage, the brewing chamber opens and the arms contribute in removing the capsule from the brewing chamber in order to make it to fall by gravity towards an underneath collecting container.

This brewing unit, even if reliable, has a high number of portions and it is not particularly compact.

WO-A-2010/103044 discloses a brewing unit with a fixed brewing chamber portion and a movable brewing chamber portion. A lever controls the opening and closing of the brewing chamber. An inclined slide is arranged between the fixed brewing chamber portion and the movable brewing chamber portion to introduce the capsule into the fixed brewing chamber portion. When the movable brewing chamber portion is moved towards the closed position by means of the actuating lever, the movable brewing chamber portion interacts with the slide to push said slide upwards, such that the capsule completely enters the fixed chamber portion and the brewing chamber can be closed. Upon opening of the brewing chamber, the slide is moved back towards the lower position by gravity.

SUMMARY OF THE INVENTION

The present invention relates a brewing unit with a brewing chamber formed by at least two portions mobile one with respect to the other with vertical insertion of the capsules, which overcomes wholly or partially at least some of the drawbacks of the known units. The object of preferred embodiments of the invention is to provide a brewing unit which is particularly compact and simple to manufacture and reliable in use.

Substantially, the brewing unit according to the invention comprises at least: a brewing chamber with a first brewing chamber portion and a second brewing chamber portion, mobile one with respect to the other to open and close the brewing chamber; a channel for inserting the capsules towards the brewing chamber; a mobile deviator interposing between the first brewing chamber portion and the second brewing chamber portion to deviate the capsules inside one of said first and second brewing chamber portions.

In some embodiments the channel for inserting the capsules is directed generally in a vertical direction to insert said capsules by gravity. Under "generally in vertical direction" an orientation is meant so as to allow the feeding of the capsules by gravity.

Preferably the two brewing chamber portions are mobile one with respect to the other according to a generally horizontal direction, that is generally orthogonal to the direction of the insertion channel.

In some embodiments the mobile deviator is arranged and controlled to interpose between the first brewing chamber portion and the second brewing chamber portion when said first and second brewing chamber portions are open and to get out of a trajectory of mutual motion of said first and second brewing chamber portions during the closing motion of the brewing chamber. The movement of the deviator to clear off the brewing chamber area is controlled by an actuating mechanism, e.g. an electric motor or a manual lever. The same actuating mechanism preferably also controls the closing and opening movement of the brewing chamber.

The motion of the mobile deviator can be a two-direction rotating motion according to angles smaller than 360°, that is in substance a pivoting motion. A particularly simple and reliable structure is obtained if the mobile deviator rotates in opposite directions around an axis substantially at 90° with respect to the direction of the closing and opening motion of the two brewing chamber portions. The rotation axis of the mobile deviator preferably is directed at about 90° with respect to the insertion direction of the capsules, that is to the channel for inserting the capsules towards the brewing chamber. Preferably the rotation or oscillation axis of the mobile deviator is arranged above the brewing chamber portions. More generally, the rotation axis and the shape of the mobile deviator are so as to bring the mobile deviator upwards above the area wherein the brewing chamber portions move.

In other but more complicated embodiments the mobile deviator can oscillate or rotate around a substantially vertical side axis, i.e. a side axis which is substantially parallel to the capsule inserting direction. In other embodiments the mobile deviator can comprise two portions cooperating with one another, oscillating or rotating around two distinct axes placed at the sides of the brewing chamber. In this case the two portions of the mobile deviator can arrange between the two brewing chamber portions when this is open, to deviate the capsule, during the falling thereof in the insertion channel, towards the inside of one of the two brewing chamber portions. When the brewing chamber has to be closed, the two portions of the deviator can open out by rotating each one around its own rotation and oscillation axis, to free the coupling area of the two brewing chamber portions.

The rotation or oscillation motion around a single substantially horizontal axis is advantageous for the structural simplicity of the brewing unit which is thus obtained, but also because in this way the mobile deviator can constitute an auxiliary member which causes or eases the detachment of the exhausted capsules from one of the brewing chamber portions in case said capsule should remain accidentally adhering to such portion.

In some advantageous embodiments the mobile deviator comprises a chute, i.e. a wall apt to assume a tilted position, which (when the brewing chamber is open) can position between the first and the second brewing chamber portions. In this position the chute is advantageously inclined from the top to the bottom and towards one of said first and second brewing chamber portions, wherein a capsule coming from the insertion channel is guided by said chute.

In general both brewing chamber portions can be mobile with respect to a fixed bearing structure or frame. However, preferably only one of said first and second brewing chamber portions is mobile and the other one is fixed with respect to a fixed bearing structure or frame, whereto it is advantageously associated and with respect whereto the channel for inserting the capsules is fixed. Preferably the mobile brewing chamber portion has a brewing recess towards which the capsule is directed and wherein the capsule is inserted with the help of the mobile deviator. In some embodiments, the brewing chamber portion towards which the mobile deviator directs the capsule is the fixed chamber portion and is in turn provided with a brewing recess.

During the capsule loading, the mobile deviator advantageously can be directed so that the capsule, inserted by gravity, meets the deviator and it is pushed towards the inside of the hollow portion of the brewing chamber. The subsequent closing motion completes the insertion of the capsule and it causes the getting out of the mobile deviator to clear the motion and closing area of the two brewing chamber portions The brewing unit can be equipped with a mechanism for manual or motorized actuation. In the first case, for example, an actuation mechanism in the form of a control lever can be provided. In the second case an electric actuator, preferably an electric motor, or an electromagnetic, or a pneumatic or a hydraulic actuator, or an actuator of another type, can be provided. The actuation mechanism controls the closing and opening motion of the brewing chamber. In preferred embodiments of the invention, the actuation mechanism controls directly or indirectly also the getting out motion of the mobile deviator, i.e. the movement with which the mobile deviator moves out of the area where the brewing chamber portion(s) move to close the brewing chamber. To this purpose, if the actuation is manual, for example a kinematic connection between a control lever, the mobile brewing chamber portion(s) and the mobile deviator can be provided. Similarly, if a different actuator is provided, e.g. a motor, a mechanical connection can be provided between the actuator and at least one of the brewing chamber portions on the one hand and between the actuator and the mobile deviator on the other, to move the mobile deviator in synchronism with the closing movement of the brewing chamber.

Preferably, the mobile deviator is controlled by the actuating mechanism also during the reverse movement, i.e. the movement bringing the mobile deviator again between the first and the second brewing chamber portion. In a less preferred embodiment this return movement is controlled by a resilient member, e.g. one or more springs. In both cases, the mobile deviator advantageously acts upon the spent capsule to assist or facilitate ejection thereof.

In some embodiments the mobile deviator is arranged such that when the brewing chamber is open, the capsule rests on the mobile deviator and on one of the brewing chamber portions, and preferably on that brewing chamber portion which forms a brewing recess wherein the capsule is introduced. In other embodiments, the mobile deviator co-acts with a movable capsule supporting member which supports the capsule from underneath before the brewing chamber is closed. In these embodiments, when the brewing chamber is open, the capsule is introduced in the brewing unit and takes up a rest position, in which it is supported by the mobile deviator on the one side (e.g. on the flat top portion thereof) and by the movable capsule supporting mechanisms on the other (e.g. at the lower area of the flange). The mobile deviator moves the capsule towards one of the brewing chamber portions but the capsule reaches the rest position without contacting the brewing chamber portion. When the brewing chamber is closed, the actuating mechanism (e.g. a control lever) used to control the closing movement of the brewing chamber, causes the movement of both the mobile deviator and the movable capsule supporting member as well, to clear the area of the brewing chamber. The capsule is pushed by the mobile deviator inside the brewing chamber portion opposing the mobile deviator and the movable capsule supporting member is cleared off to allow closing of the brewing chamber. The movements of the brewing chamber portion(s), of the mobile deviator and of the movable capsule supporting member can be suitably co-ordinated and synchronized using a single actuating member.

Using the movable capsule supporting member to support the capsule from below, instead of positioning it to rest directly on the brewing chamber portion opposing the mobile deviator increases the reliability of the brewing unit. In fact, if the side wall of the capsule is damaged, e.g. deformed or indented, resting thereof directly on the edge of the brewing chamber would cause the capsule to take a wrong rest position. The brewing unit would then be prone to malfunctioning. Conversely, placing the capsule with its flange against the movable supporting member ensures proper operation of the brewing unit even if the side wall of the capsule is deformed, because the flange or edge thereof usually maintains its correct shape.

The invention also relates to a machine for producing beverages, for example a coffee machine, which comprises a brewing unit as described above.

Additional features and embodiments of the invention are described hereinafter by referring to an implementation example and in the enclosed claims, which form integrating part of the present description.

BRIEF DESCRIPTION OF THE DRAWINGS

The invention will be better comprised by following the description and the enclosed drawing, which shows exemplary embodiments of the invention. More in detail, in the drawing:

FIGS. 5, 6 and 7 show views and sections similar to those of FIGS. 1, 3 and 4 in a subsequent phase, wherein the capsule has been inserted in an intermediate position between the two brewing chamber portions in closed position;

FIGS. 8, 9 and 10 show sections and views similar to those of FIGS. 5, 6 and 7 in a closing phase of the brewing chamber;

FIGS. 21 and 22 show a perspective view of the brewing unit according to a first embodiment in open and closed position, respectively;

FIG. 23 shows a plan view of the brewing unit of FIG. 21 in an open position during insertion of a capsule;

FIG. 24 shows a side view according to line XXIV-XXIV in FIG. 23;

FIGS. 25 and 26 show cross sections according to lines XXV-XXV and XXVI-XXVI in FIG. 23;

FIGS. 27 and 28 show a plan view and a side view according to line XXVIII-XXVIII in FIG. 27, respectively, of the brewing unit before closure of the brewing chamber;

FIGS. 31 and 32 show a plan view and a side view according to line XXXII-XXXII in FIG. 31, respectively, of the brewing unit during closure of the brewing chamber;

FIGS. 33 and 34 show cross sections according to lines XXXIII-XXXIII and XXXIV-XXXIV in FIG. 31;

FIGS. 39 and 40 show a plan view and a side view according to line XL-XL in FIG. 39, respectively, of the brewing unit during opening of the brewing chamber and discharge of the spent capsule;

FIGS. 47-50 show sections according to a vertical plane of a brewing unit according to the invention in yet another embodiment, the figures showing the closing sequence of the brewing chamber;

FIGS. 54-57 show longitudinal sectional views according to a central median plane of the brewing unit of FIG. 53 in different positions during the closing movement of the brewing chamber.

DETAILED DESCRIPTION OF EMBODIMENTS THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Hereinafter reference will specifically be made to brewing units using pre-packaged capsules for the preparation of coffee beverages. However it should be understood that the invention can be embodied also in brewing units using loose ingredients, such as coffee powder, as well as to units for the preparation of different kinds of edible products by means of extraction with hot pressurized water.

Embodiment of FIGS. 1A to 20

Hereinafter the coffee production will be specifically referred to, but it should be understood that the brewing unit object of the present invention can be used even to handle capsules containing ingredients destined to the production of other types of liquid food products, that is beverages.

Figure 19:
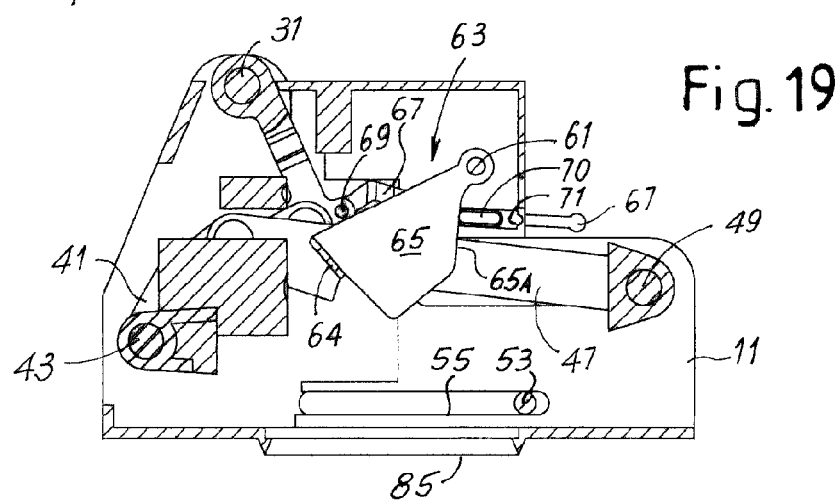
Figure 20:
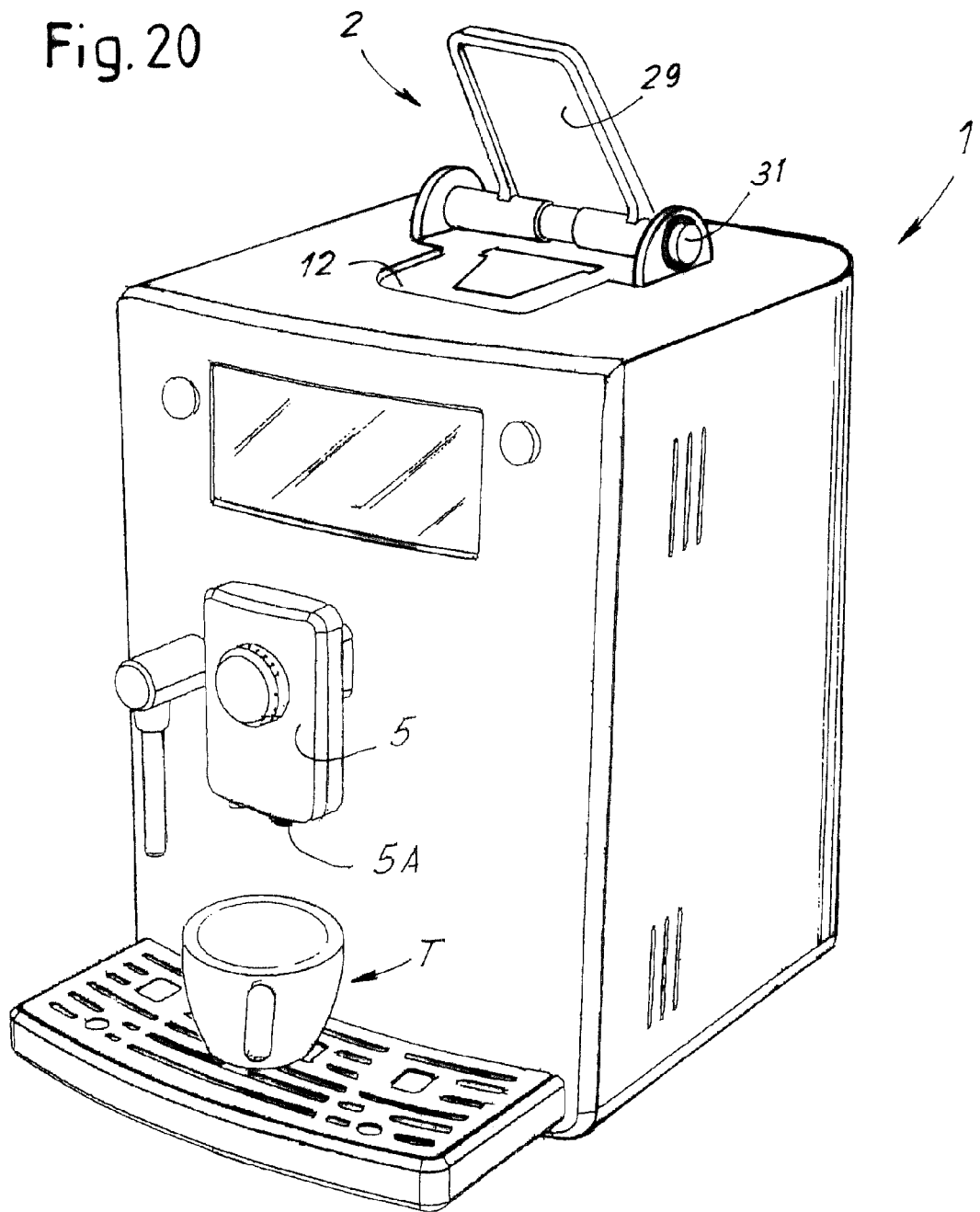
FIG. 20 shows a schematic outer view of a machine wherein the brewing unit according to the invention can be incorporated.

FIG. 20 shows generically a coffee machine of manual type using capsules, wherein a brewing unit is installed having the structure which will be described hereinafter by referring to FIGS. 1 to 19. The machine 1 comprises a resting plane 3 for cups T placed under a supplying unit 5 with two nozzles 5A which supply beverage produced by the brewing unit 2.

The brewing unit 2 comprises a fixed structure or frame formed by flanks 11 and by an upper block 12 constrained to one another and mounted in a fixed position inside the machine 1. Two portions of a brewing chamber are arranged between the flanks 11. As it can be seen in particular in the section of FIG. 3, the brewing unit comprises at least a first mobile brewing chamber portion 13 and a second fixed brewing chamber portion 16. In the illustrated example, the mobile portion 13 forms inside thereof a brewing recess 13A wherein the brewing capsule C is inserted with a motion described hereinafter.

A substantially cylindrical hollow member 15 is housed inside the brewing recess 13A, with an inner wall 15A having a shape reproducing the shape of the outer side surface of the capsule C, in the illustrated example an approximatively truncated conical shape. The hollow member 15 is elastically biased by a spring 17 interposed between the hollow member and the bottom 13B of the brewing chamber portion 13 and forms an ejector to eject the capsule from the inside of the brewing chamber portion 13.

In some embodiments a perforator 19 is fastened to the bottom 13B of the mobile brewing chamber portion 13, which perforator, in the illustrated example, has a plurality of apertured or hollow conical projections, where through the beverage produced inside the brewing chamber is dispensed, which is then collected in a beverage dispensing duct 21 (FIG. 2) in flow connection with the supplying unit 5.

In some embodiments, the fixed brewing chamber portion 16 comprises in substance a small plate 23 whereto a perforator 25 is fixed with a plurality of sharp-edged projections opposed to the sharp-edged projections of the perforator 19. A duct for supplying hot water under pressure towards the brewing chamber is designated with 27. The water flows through the perforator 25 to penetrate inside the capsule C once this has been locked inside the brewing chamber and perforated by the perforators 19 and 25.

The use of two perforators to perforate the bottom and the upper surface of the capsule C allows using sealed capsules, made of plastic, metallic sheet or other suitable material. The possibility of omitting one or the other one, or both perforators, is not excluded, for example when capsules are used which open for example by the effect of the water pressure outside and/or of the drink pressure inside the capsule or when capsules are used, which have one or both opposed faces provided with a water-permeable area, for example closed with a non woven cloth or a filter made of paper or other permeable material.

In the illustrated example the closing and opening motion of the brewing chamber is obtained by moving the mobile brewing chamber portion 13 according to the double arrow f13 by means of a manually actuated control lever 29. In other embodiments the possibility of using a different manual mechanism or even an actuator, for example an electric motor, or a pneumatic or hydraulic system or any other control actuator is not excluded.

Figure 1:
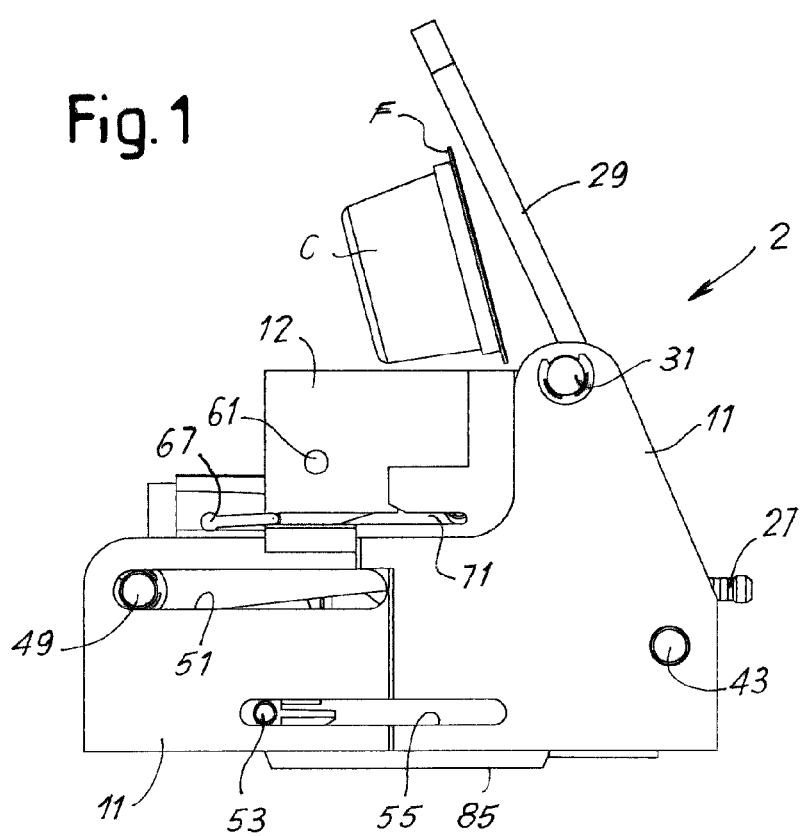
FIG. 1 shows a side view of the brewing unit according to the invention in the phase for receiving a new capsule.
Figure 2:
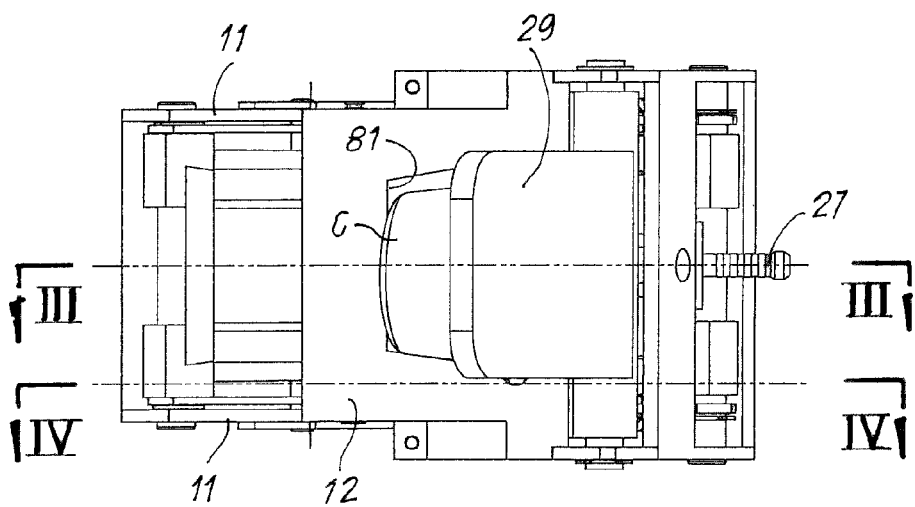
FIG. 2 shows a plan view according to II-II of FIG. 1.
Figure 1A:
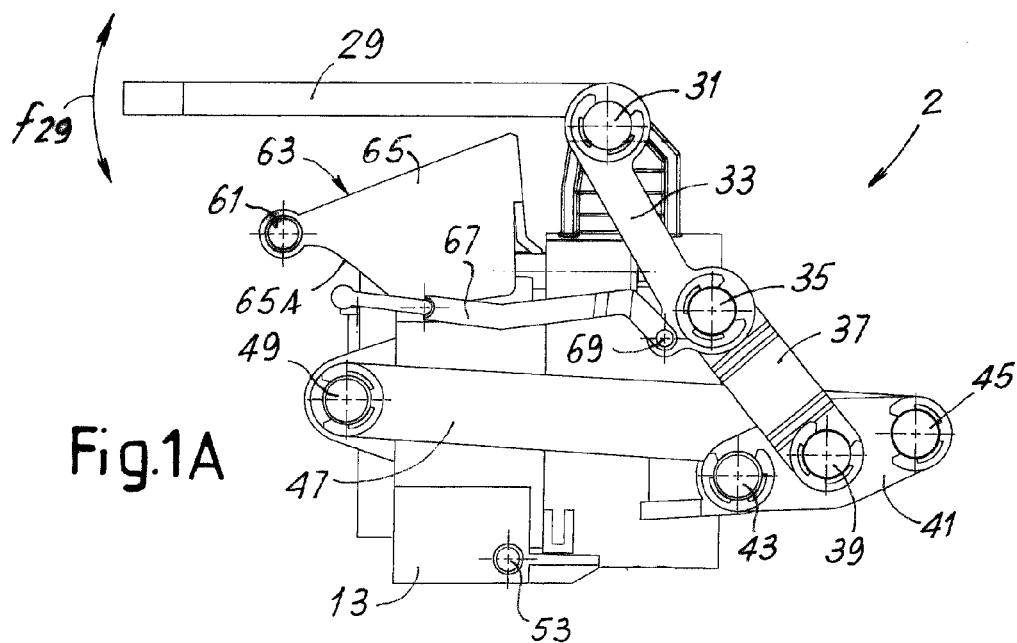
FIG. 1A shows a side view of the brewing unit without the side flanks to show the kinematism for transmitting the motion from the lever to the brewing unit.
Figure 1B:
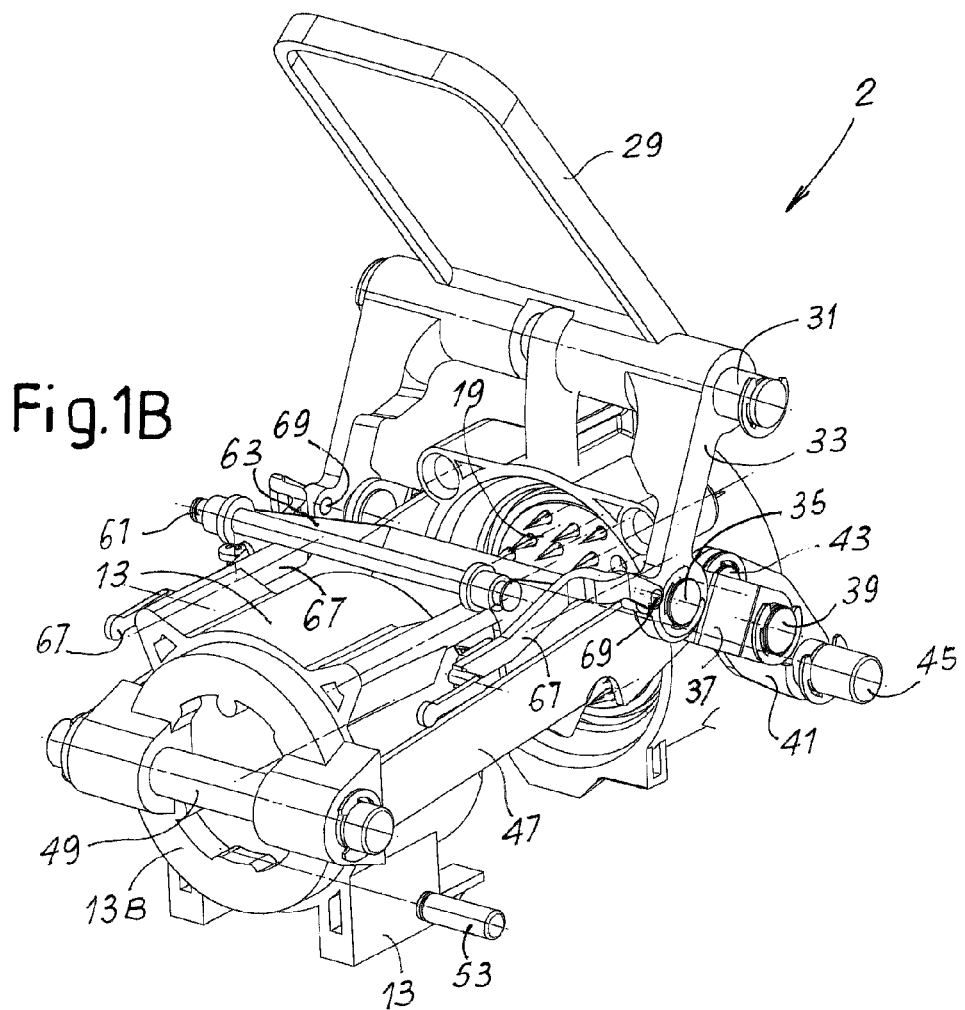
FIG. 1B is an axonometric view of the brewing unit without the side flanks.
Figure 3:
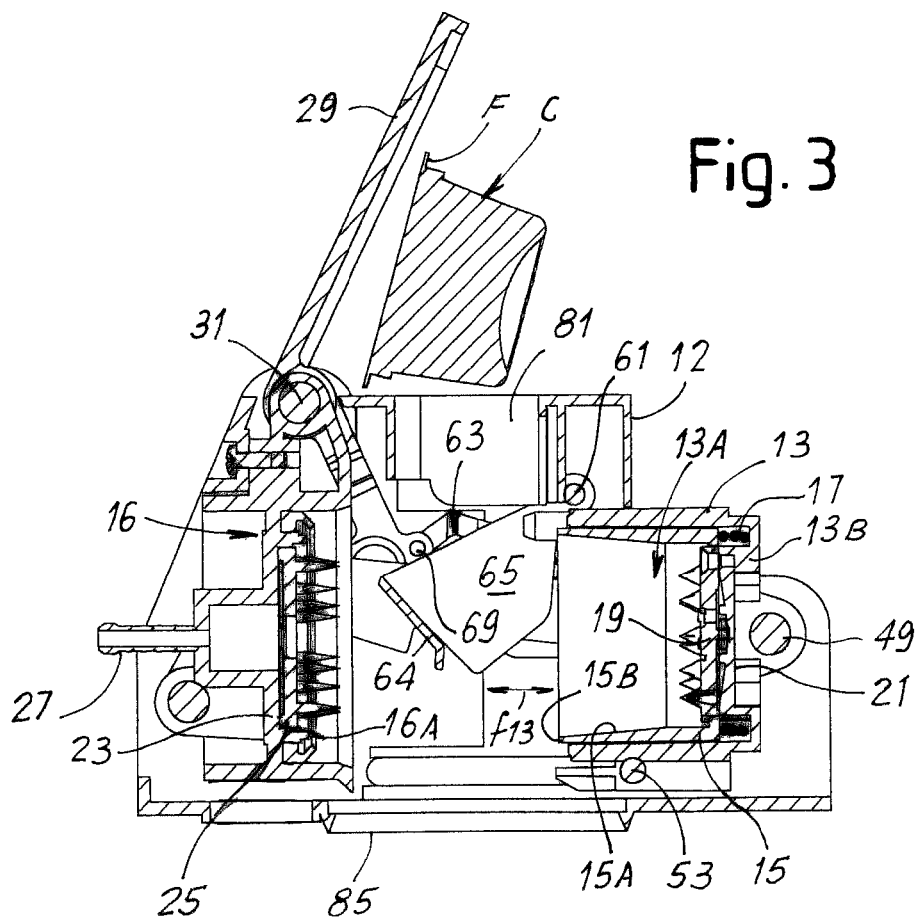
FIGS. 3 and 4 show sections according to III-III and IV-IV of FIG. 2.
Figure 4:
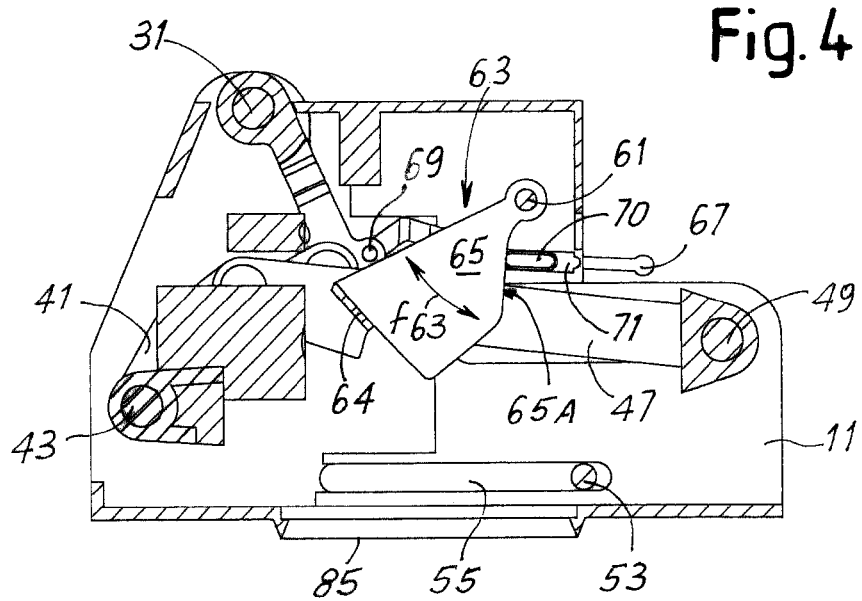

In the illustrated example the control lever 29 is hinged in 31 to the pair of flanks 11 forming a portion of the bearing structure of the brewing unit 2. The control lever 29 has (see in particular also FIG. 12) a pair of arms 33 rigidly constrained to the control lever 29 and hinged at a pin 35 to a pair of rods 37, in turn hinged by means of a pin 39 to a pair of cranks 41. The latter are hinged with a pin 43 to the bearing structure formed by the flanks 11. Two additional rods 47, articulated by means of a pin 49 to the mobile brewing chamber portion 13, are hinged by means of a pin 45 to the cranks 41 in opposite position with respect to the pin 43. The kinematism is visible in particular in FIGS. 1A, 1B, wherein the flanks of the fixed structure have been removed to show more clearly these details of the device.

With this kinematism the rotation according to the double arrow f29 of the control lever 29 around the pin 31 causes the sliding of the mobile brewing chamber portion 13. The sliding motion of the mobile brewing chamber portion 13 is guided by means of the pin 49 in guides 51 provided in the flanks 11 of the fixed bearing structure. An additional cross pin 53, parallel to the pins 31, 35, 39, 43, 45 and 49, is further integral with the mobile brewing chamber portion 13, which cross pin constitutes a guiding member of the mobile brewing chamber portion 13, which engages in an additional pair of guides 55 formed in the flanks 11 parallel to the guides 51, so as to keep in horizontal position the mobile brewing chamber portion 13 during the closing and opening motion of the brewing chamber.

A mobile deviator member 63 is articulated at a pin 61 to the upper block 12 of the bearing structure 11, 12, which member has a wall or chute 64 supported by pivoting arms 65 hinged to the pin 61. The pin 61 is parallel to the articulation pins of the control kinematism of the brewing chamber described above and orthogonal to the direction f13 of the closing and opening motion of the brewing chamber. As it will be explained hereinafter the mobile deviator 63 aims at guiding and deviating by means of the chute 64 a capsule towards the inside of the mobile brewing chamber portion 13 and to favour the discharge, i.e. the ejection of the exhausted capsule C after the brewing cycle.

The rotation motion of the mobile deviator 63 around the pin 61 is obtained by means of a kinematic connecting member 67 between the control lever 29 and the mobile deviator 63. In the illustrated embodiment the kinematic connection member 67 is constituted by a pair of shaped bars hinged in 69 to respective arms 33 and each one provided with a projection 70 faced towards the inside of the flanks of the brewing unit 2, sliding in guides 71 implemented in the block 12. By means of the interaction between the projections 70 and the guides 71, the position of the shaped bars 67 is kept during the whole opening and closing motion of the brewing chamber 13, 16. Furthermore, the projections 70 of the shaped bars 67 cooperate with cam profiles 65A provided on the two oscillating arms 65 of the mobile deviator 63 and in substance they act as feelers for the cams formed by said profiles 65A.

The operation of the brewing unit described so far is the following.

In FIGS. 1 to 4 the brewing unit is open. A channel 81 for inserting the capsules C, implemented inside the fixed block 12 of the bearing structure, can be accessed by the user from the upper portion of the machine, advantageously near the control lever 29. The user can then insert a capsule C inside the insertion channel 81. The capsule falls by gravity towards the inside of the brewing unit 2, reaching the position illustrated in particular in the section of FIG. 6. During the fall along the insertion channel 81 the capsule C meets the chute 64 supported by the pivoting arms 65.

In this position of the brewing unit 2 the mobile deviator 63 is in a position so that the capsule C, by meeting the chute 64, is deviated with its own bottom towards the brewing recess 13A defined inside the mobile brewing chamber portion 13, as shown in FIG. 6. Before the brewing unit is closed by actuating the control lever 29, the capsule is then kept in this position by resting on one side onto the chute 64 of the mobile deviator 63 and on the other side to the edge of the hollow member 15 housed inside the recess 13A of the mobile brewing chamber portion 13 (FIG. 6).

Figure 11:
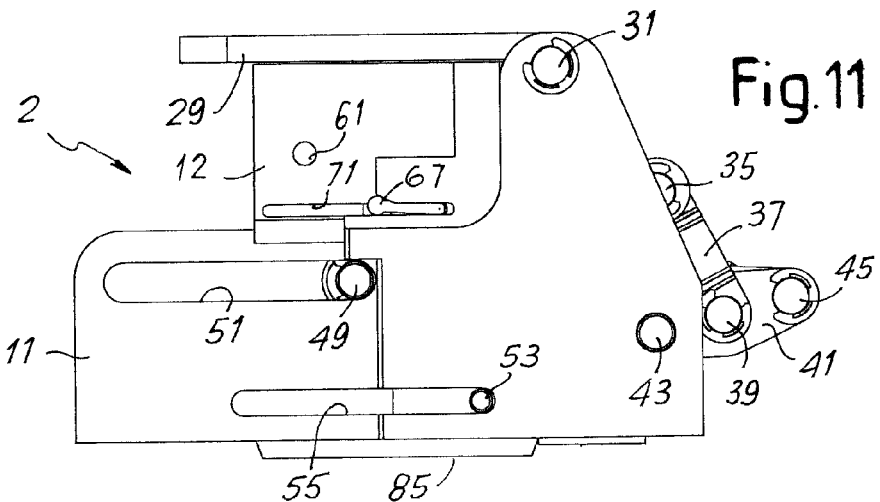
FIGS. 11, 12 and 13 show sections and views similar to those of FIGS. 8, 9 and 10 with the closed brewing unit and the capsule enclosed in the brewing chamber.
Figure 12:
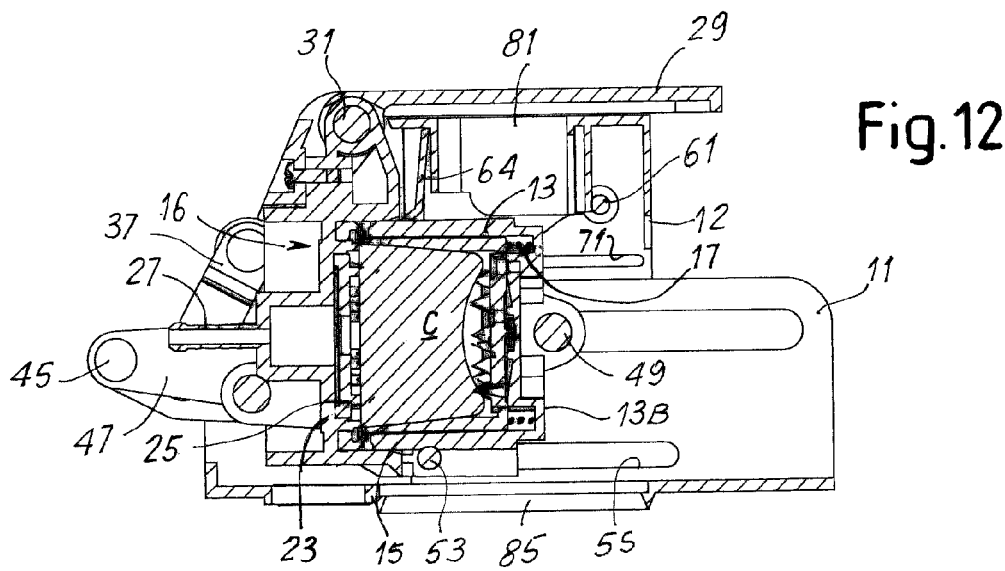
Figure 13:
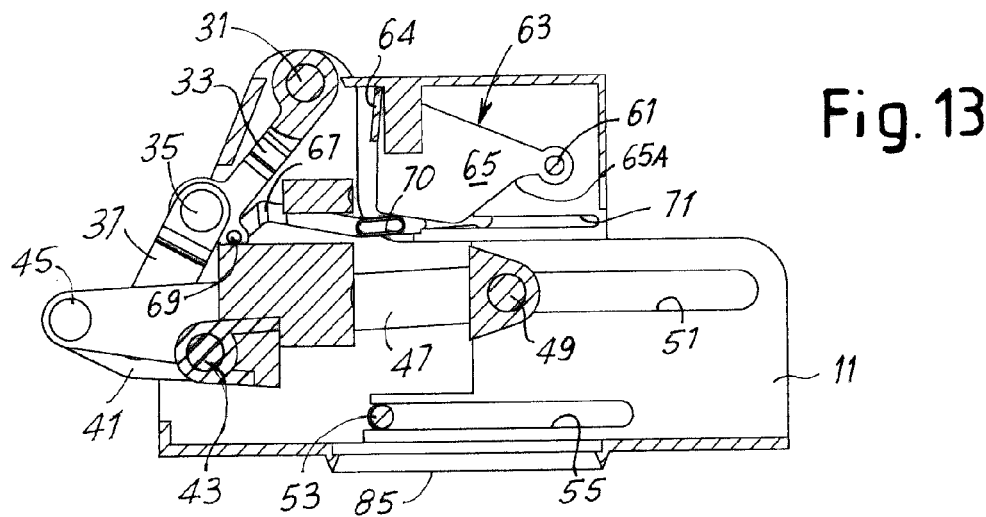

By actuating the control lever 29 downwards the brewing unit 2 closes by moving from the position illustrated in FIGS. 5 to 7 until reaching the closing and brewing position of FIGS. 11 to 13. FIGS. 8 to 10 show an intermediate position during the closing motion.

During the closing motion the mobile deviator 63 is gradually lifted and moved out of the area wherein there are the mobile brewing chamber portion 13 and fixed brewing chamber portion 16. This lifting motion by means of rotation around the pin 61 is obtained by the projections 70 pushing on the cam profile 65A of the arms 65 of the mobile deviator 63. By shifting upwards the mobile deviator 63 it is then possible to free wholly the area of the brewing chamber which can close by bringing the mobile brewing chamber portion 13 in abutment against the fixed brewing chamber portion 16. The movement of the movable chamber portion 13 towards the mobile deviator 63 and towards the fixed chamber portion 16 causes the capsule C to further penetrate inside the brewing recess 13A, as shown in particular in FIG. 9. The mobile deviator 63 does not loose contact with the capsule C before the capsule has sufficiently penetrated into the movable brewing chamber portion 13 and the latter has sufficiently approached the fixed brewing chamber portion 16, such that upon removing the mobile deviator 63 from the space between the two brewing chamber portions 13, 16 the capsule is safely retained between the two brewing chamber portions 13, 16 and sealingly engaged therebetween. When the brewing chamber is closed, the flange F of the capsule C is locked between the edge 15B of the hollow member 15 housed in the mobile brewing chamber portion 13 and an edge 16A of the fixed brewing chamber portion 16. The projections of the perforators 25 and 19 penetrate respectively in the front surface and in the bottom of the capsule C thus putting in communication the inner volume of the capsule with the duct hot pressurized water feeding duct 27 and with the beverage dispensing duct 21.

The perforation of the bottom of the capsule C can take place by the effect of the mechanical closure of the brewing chamber or it can take place in a delayed manner by providing that the capsule has a concave bottom as illustrated in the drawing, which deforms under the effect of the thrust exerted by the water under pressure supplied through the duct 27, until completing the perforation by deformation of the bottom against the projections of the perforator 19 of the mobile brewing chamber portion 13.

Figure 14:
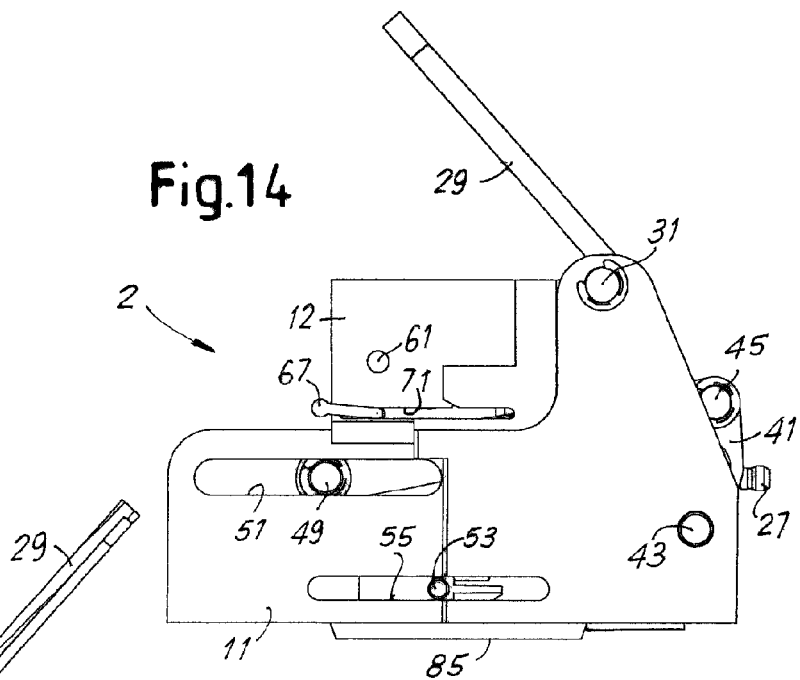
FIGS. 14, 15 and 16 show sections and views similar to those of FIGS. 11, 12 and 13 in and opening phase of the brewing chamber after the brewing cycle.
Figure 15:
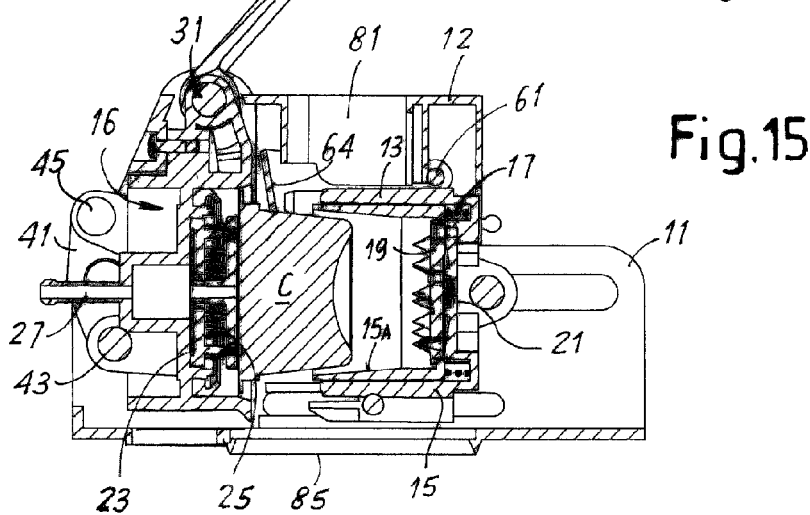
Figure 16:
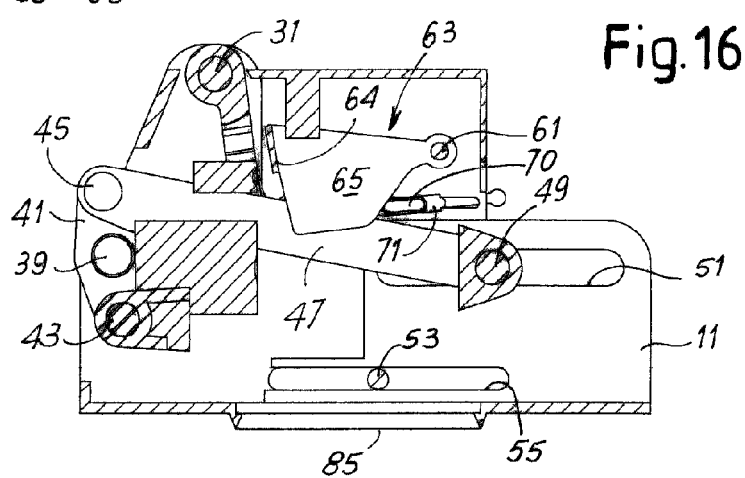
Figure 17:
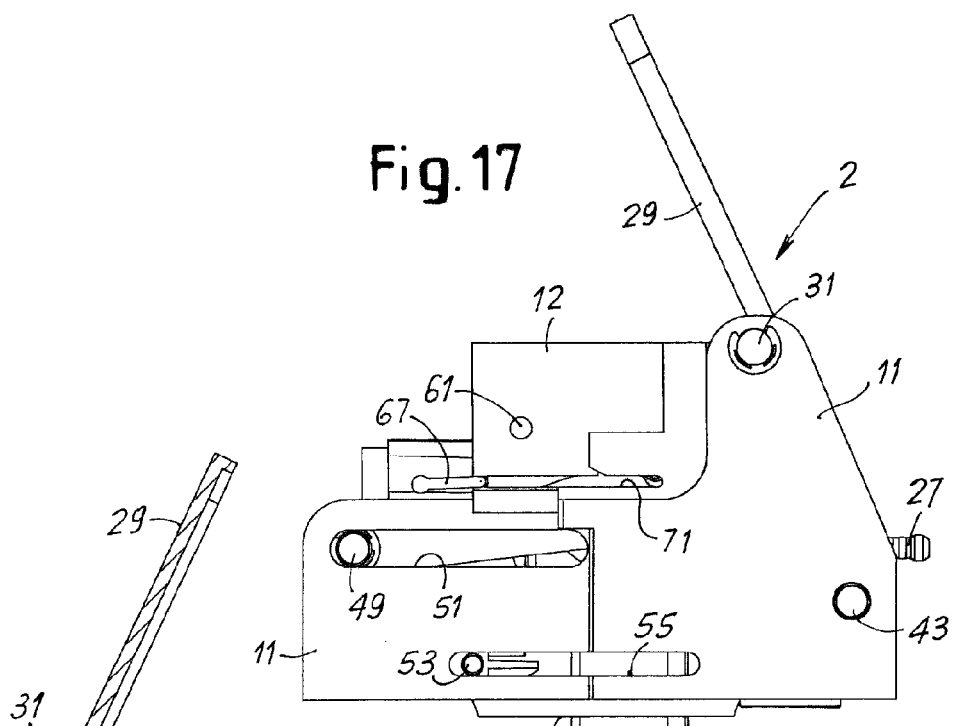
FIGS. 17, 18 and 19 show sections and views similar to those of FIGS. 14, 15 and 16 in the falling phase of the exhausted capsule from the brewing unit.
Figure 18:
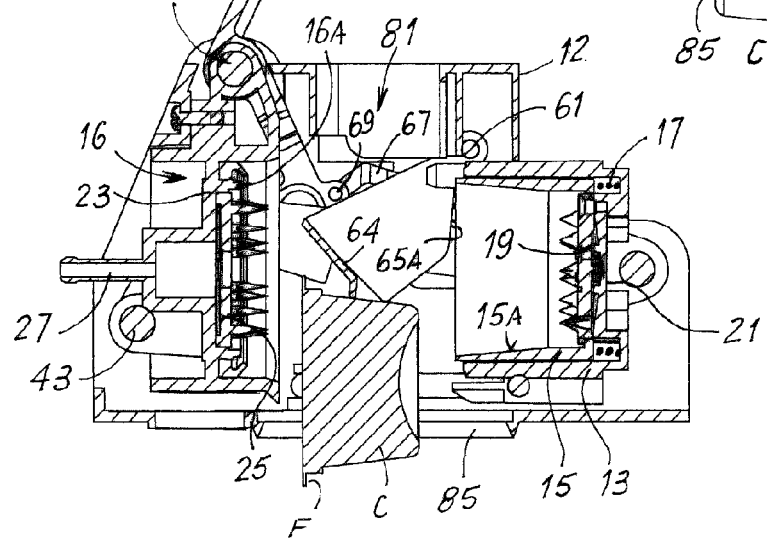

Once ended the brewing cycle, with an inverse rotation motion of the control lever 29 the brewing unit is opened as illustrated in FIGS. 14 to 16. The mobile deviator 63 is pushed downwards by a resilient member, not shown, so that the chute 64 of the mobile deviator 63 pushes against the capsule C. The latter is ejected or at least partially taken off from the brewing recess 13A of the mobile brewing chamber portion 13 by the effect of the elastic push of the springs 17 on the hollow member 15, thus avoiding that the capsule remains inside the mobile brewing chamber portion 13. The push exerted on the upper side on the capsule C by the mobile deviator 63 prevents the capsule from adhering to the fixed brewing chamber portion 16 and more in particular to the projections of the perforator 25, thus ensuring that the exhausted capsule falls down by gravity (FIGS. 17 to 19).

Instead of a resilient member pushing downwards the mobile deviator 63 so that the cam profiles 65A remain in contact with the projections 70, a bidirectional constraint between the projections 70 and the mobile deviator 63 can be provided, for example the projections 70 can be engaged in a shaped slot implemented onto the arms 65.

The exhausted capsule C passes through an opening 85 provided in the bearing structure and it reaches a collecting tray where from it is then removed by the user.

Embodiment of FIGS. 21-42

A further embodiment of a brewing unit according to the invention and the operation thereof is illustrated in FIGS. 21-42.

The brewing unit, labelled 102 as a whole, comprises a fixed shell 110 and a block 112 arranged on top of said fixed shell 110 and constrained thereto. The shell 110 and the block 112 are mounted in a fixed position inside the machine 1. The shell 110 encloses a structural frame to which two portions of a brewing chamber are constrained. The structural frame surrounds the brewing chamber and the forces generated inside the brewing chamber during the brewing process are discharged on said structural frame.

More specifically, in some embodiments the structural frame comprises two lateral tie rods 111. In some embodiments each tie rod is made of a sheet of metal or other suitable material. The tie rods 111 form structural components of the structural frame supporting the brewing chamber, i.e. components on which stresses generated by the brewing pressure are applied.

First ends 111A of the two tie rods 111 are connected to one another by a transverse shaft 113. The opposite second ends 111B of the tie rods 111 are shaped such as to form a connector member for connection to a water heater 115. In some embodiments the ends 111B of the tie rods are provided with a through hole, for example square in shape. The edge of the through holes can be shaped such as to provide a mechanical connection by means of mechanical interference with corresponding protrusions 115A provided on the outer surface of the water heater 115. In other embodiments, different constraining members can be provided, e.g. screws or the like.

The two tie rods 111, the shaft 113 and the water heater 115 structurally cooperate with one another and form said structural frame which supports the forces generated in the brewing chamber during brewing. The water heater 115 forms therefore a structural component of said frame.

In some embodiments the water heater 115 comprises a main body 115B, e.g. formed by a block made of metal, e.g. aluminium or an aluminium-based alloy or other heat-conductive material. The protrusions 115A are preferably formed on the outer side surface of the main body 115B. In some embodiments, the block forming the main body of the water hater 114 made by pressure die-casting. The protrusions 115A can be formed integrally with the main body 115B during die-casting thereof.

In some embodiments, the main body 115B encloses an electric resistor 115C and a water duct 115D. Both the electric resistor 115C and the water duct 115D can be helically wound around an axis of the body 115B of the water heater 115. The connectors of the electric resistor 115D to a power line are labelled 116, and a water connection to a water pump delivering water to the water heater 115 is shown at 118.

A water heater of this kind is usually called instant or flow-through water heater, i.e. one in which a very small amount of water is contained in the helically shaped water duct 115D and wherein the electric resistor 115C is sufficiently powerful to heat the water while it flows through the water heater 115 during use. A different water heater can be used instead, such as a boiler with an accumulation vessel, in which a larger amount of hot water is maintained at the required temperature by a smaller resistor. In this embodiment the water heater forms a structural component of the frame supporting the brewing chamber. Though, a flow-through water heater offers better mechanical resistance in addition to other advantages in terms of power consumption.

In some embodiments the brewing chamber comprises two portions. In the embodiment shown the brewing chamber includes a first brewing chamber portion 121 and a second brewing chamber portion 123. In some embodiments the first brewing chamber portion 121 is mounted fixed with respect to the frame formed by the tie rods 111, the shaft 113 and the boiler 115. Preferably the first brewing chamber portion 121 is attached to the water heater 115 or in heat-contact with the body thereof.

In the embodiment shown in the drawings the first brewing chamber portion 121 is connected to the water heater 115 with the interposition of an intermediate shaped plate 122. The water heater 115 is thus in heat contact with the brewing chamber portion 121 through said intermediate shaped plate 122. Heat contact means that heat can be transmitted from the main body 115B of the water heater to the brewing chamber portion 121 by conduction, such that the water heater 115 can keep the brewing chamber portion 121 at a temperature higher than the ambient temperature due to heat conduction.

The second brewing chamber portion 123 is movable with respect to the first brewing chamber portion 121 according to the double arrow f123 along a direction substantially parallel to the axis A-A of the brewing chamber.

In some embodiments, at least one of said brewing chamber portions or both said brewing chamber portions are provided with perforation means to perforate a capsule C containing the ingredients for the preparation of the coffee beverage. In the embodiment shown in the drawings the fixed brewing chamber portion 121 is provided with perforators 125 extending through holes in a disc member 127 slidably arranged in the fixed brewing chamber portion 121. The disc member 127 is provided with a sealing ring 129 co-acting with an annular edge of the opposite movable brewing chamber portion 123. When the brewing chamber is closed and the brewing cycle starts, hot water flowing from the water heater 115 enters the brewing chamber through a duct 124, flows through the holes provided in the disk member 127 and enters the capsule C through apertures punched in the top surface of the capsule by the perforators 125.

When the brewing chamber opens after a brewing cycle has been completed, springs (not shown) push the disc member 127 away from the bottom of the housing formed by the outer substantially cylindrical wall of the fixed brewing chamber portion 121, such as to function as an extractor of the capsule C after brewing has taken place.

As can be seen in the drawings, the fixed brewing chamber portion 121 is arranged just adjacent the water heater 115, such that the water flows along a very short path from the water heater 115 to the interior of the brewing chamber and substantially no heat is wasted. Also the beverage dispensed during the first brewing cycle following a period of standby of the machine is sufficiently hot, since substantially no cold water remains between the water heater 115 and the brewing chamber.

The movable brewing chamber portion 123 is cup-shaped and near the bottom thereof a plate 131 can arranged, which is advantageously provided with perforating protrusions 133. In some embodiments, the protrusions 133 are apertured such that the beverage extracted from the ingredients contained in the brewing chamber exits the brewing chamber through passages extending along the protrusions 133.

A substantially cylindrical hollow member 135 can be housed inside the recess of the movable chamber portion 123. The cylindrical hollow member 135 is provided with an inner wall 135A which can have a shape corresponding to the shape of the outer side surface of the capsule C, in the illustrated example an approximately truncated conical shape. The hollow member 135 is elastically biased by a spring 137 arranged between the cylindrical hollow member and the bottom of the movable brewing chamber portion 123. Said cylindrical hollow member 135 acts as an ejector to eject the capsule C from the inside of the movable brewing chamber portion 123 after brewing. In the drawings, for the sake of simplicity, the spring 137 is always shown in its compressed condition, even when the brewing unit is open.

Two perforator means to perforate the bottom surface and the top surface of a capsule C as described herein, allow using sealed capsules, made of plastic, metallic sheet or other suitable material. The possibility of omitting one or the other, or both perforator means, is not excluded, as mentioned above in relation with the previously described embodiment of FIGS. 1 to 19.

While the fixed brewing chamber portion 121 is fixedly supported on the water heater 115, the movable portion 123 of the brewing chamber is slidingly supported within the frame formed by the water heater 115, the tie rods 111 and the shaft 113. More specifically, in the example shown the movable portion 123 of the brewing chamber is provided with two pairs of laterally projecting pins 123A, 123B. The pins 123A are slidingly engaged in slots 110A of the outer shell 110, while the pins 123B are slidingly engaged in slots 110B of the outer shell 110 and in corresponding slots 111A of the two oppositely arranged tie rods 111. A different guiding mechanism for slidingly guiding the brewing chamber portion with respect to the frame can be envisaged, e.g. a single pair of pins having an elongated cross-section.

A suitable manual or servo-actuator is provided for controlling the movement of the movable brewing chamber portion 123. In the example shown in the drawings, the movement of the movable brewing chamber portion 123 is controlled by a crank 141 pivoted at 143 to a corresponding pair of rods 147. The rods are in turn hinged at 148 to the movable brewing chamber portion 123. The crank 141 is hinged about the shaft 113 and is integral with appendages 145. Said appendages are in turn hinged at 146 to tie rods 149 hinged at 151 to a control lever 156. The control lever 156 is in turn pivotally engaged at 157 to a protrusion 159 solid to the fixed brewing chamber portion 121 or to any other part rigidly connected to the frame surrounding the brewing chamber.

The rotation of the control lever 156 about the hinge 157 according to double arrow f156 causes the rotation of the crank 141 about the shaft 113. The rotary motion of the crank 141 is transformed by the crank-rod connection 141-147 into a translation motion of the movable brewing chamber portion 123.

Other kinds of actuating mechanisms can be used to control the closing and opening movement of the brewing chamber. For example an electric motor or a hydraulic or pneumatic actuator can be used, which acts for example on a shaft controlling the movement of the crank 141.

According to the embodiment shown in FIGS. 21-42 the capsule C is introduced into the brewing chamber by gravity. For that purpose, an aperture 160 is provided on a top surface 112A of the block 112.

When the brewing chamber is in the open position (FIGS. 23-26) a mobile deviating member 163, hinged by means of a pin 161 to the upper block 112, is arranged underneath said aperture 160.

The mobile deviating member 163 can be comprised of a wall or chute 164 supported by oscillating arms 165. The pivoting pin 161 is parallel to the shaft 113 and to the pivoting axes of the transmission members 156, 149, 147, 141 described above and orthogonal to the direction f123 of the closing and opening motion of the brewing chamber.

As will be explained in more detail hereinafter, the mobile deviator 163 aims at guiding and deviating a capsule C towards the inside of the mobile brewing chamber portion 123 and to favour the discharge, i.e. the ejection of the exhausted capsule C after brewing.

The rotation motion according to the double arrow f163 of the mobile deviator 163 around the pin 161 can be imparted preferably by the control lever 156. In the illustrated embodiment, this motion is obtained by means of a kinematic connecting member between the control lever 156 and the mobile deviator 163. In the illustrated embodiment the kinematic connection member comprises a pair of sliders 168, each provided with a slotted cam profile 168A into which corresponding pins 156A engage, said pins 156A being arranged at the ends of projections 156B integral to the lever 156. Rotation of the lever 156 causes therefore a sliding motion of the sliders 168. Each slider 168 has an end projection 168B opposite the respective slotted cam profile 168A. Each end projection 168B engages into a slit 165A of the corresponding arm 165 of the mobile deviator 163. With this arrangement, the reciprocating motion of the sliders 168 imparts a pivoting motion to the mobile deviator 163. The control lever 156, therefore, controls in a synchronized manner the pivoting movement of the mobile deviator 163 and the translation movement of the brewing chamber portion 123.

The operation of the brewing unit described so far is as follows. In FIGS. 23 to 26 the brewing unit 102 is open. The aperture 160 can be accessed by the user from the upper portion of the machine. The user can insert a capsule C inside the insertion aperture 160. The capsule C falls by gravity into the brewing unit 102, reaching the position shown in particular in the section of FIG. 29. The capsule C meets the chute 164 supported by the pivoting arms 165 and is stopped.

Figure 29:
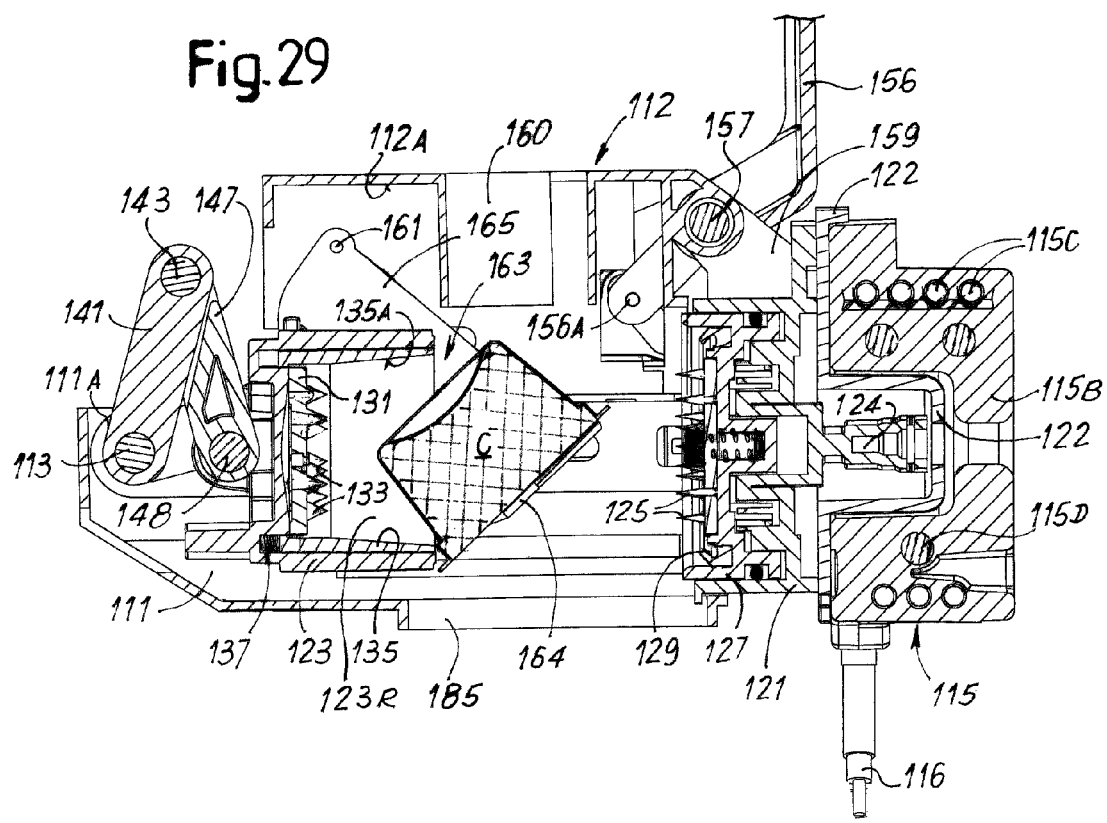
FIGS. 29 and 30 show cross sections according to lines XXIX-XXIX and XXX-XXX in FIG. 27.
Figure 30:
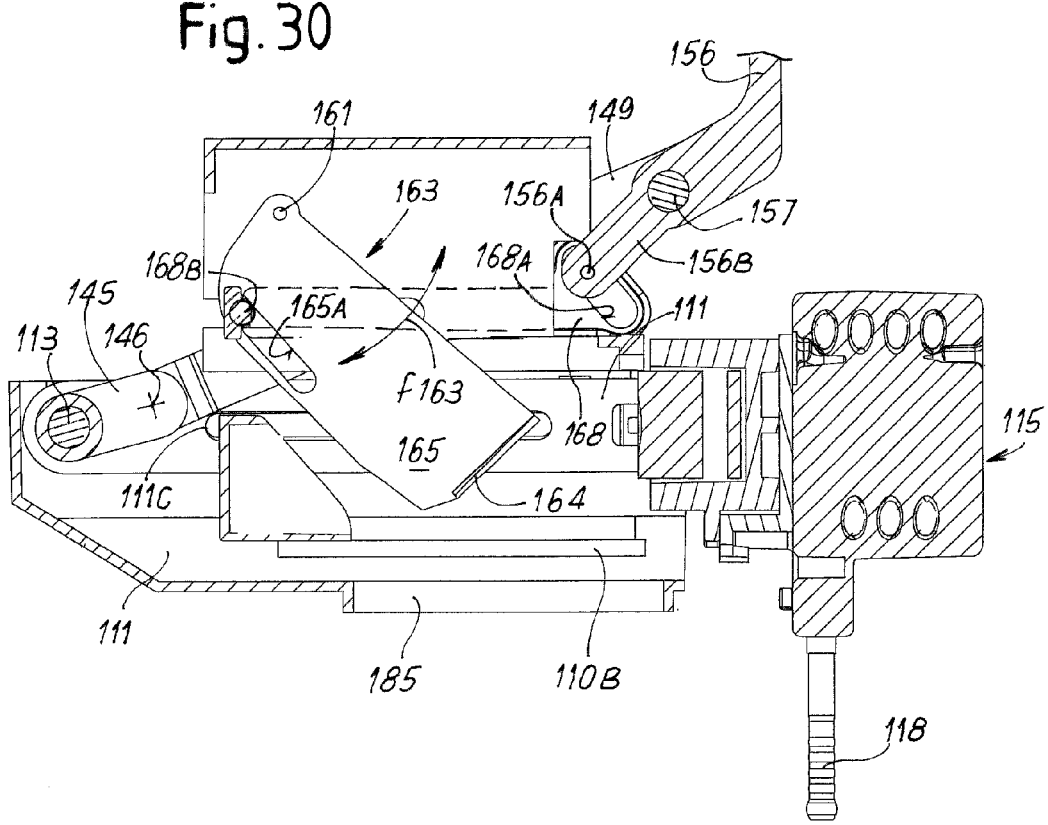
Figure 35:
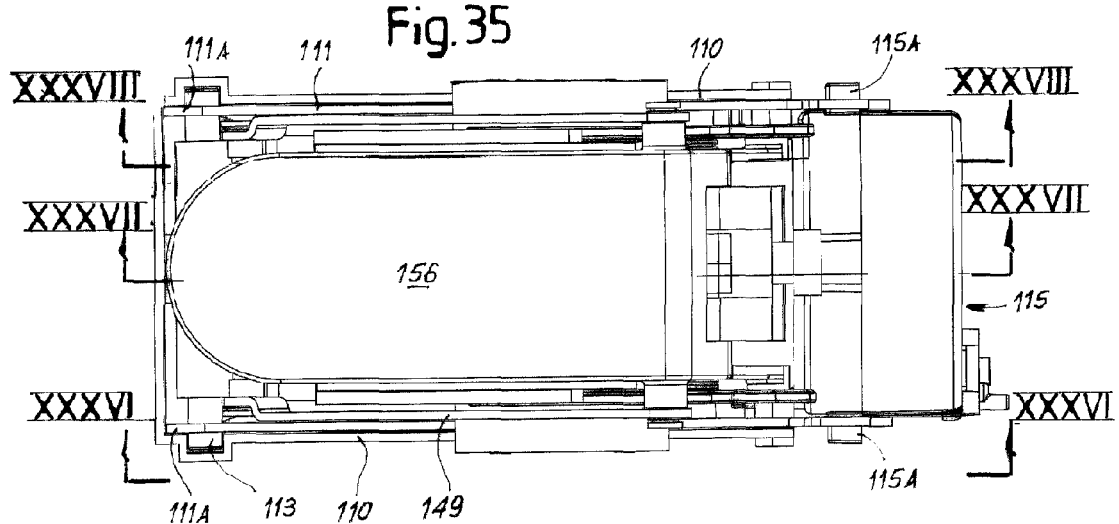
FIGS. 35 and 36 show a plan view and a side view according to line XXXVI-XXXVI in FIG. 35, respectively, of the brewing unit in the brewing position.
Figure 36:
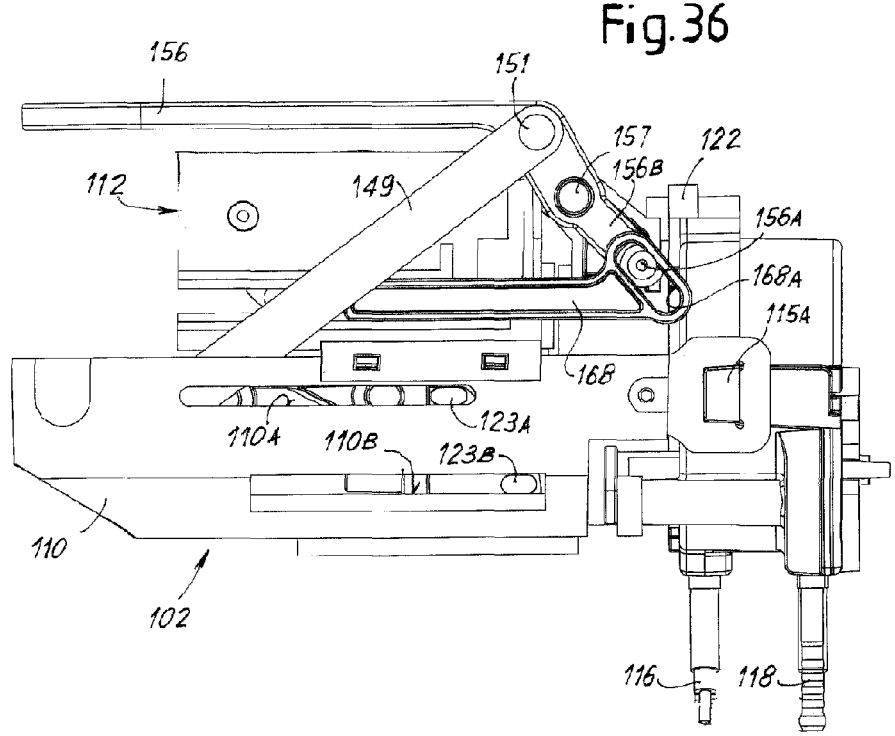
Figure 37:
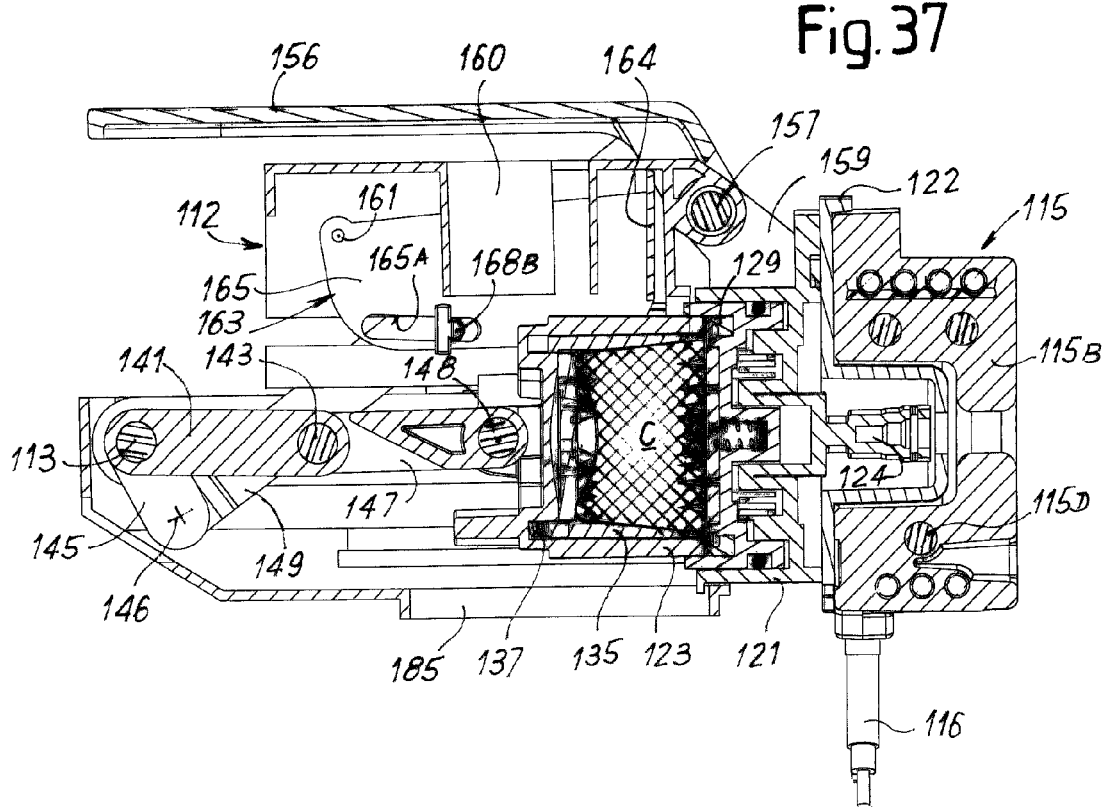
FIGS. 37 and 38 show cross sections according to lines XXXVII-XXXVII and XXXVIII-XXXVIII in FIG. 35.
Figure 38:
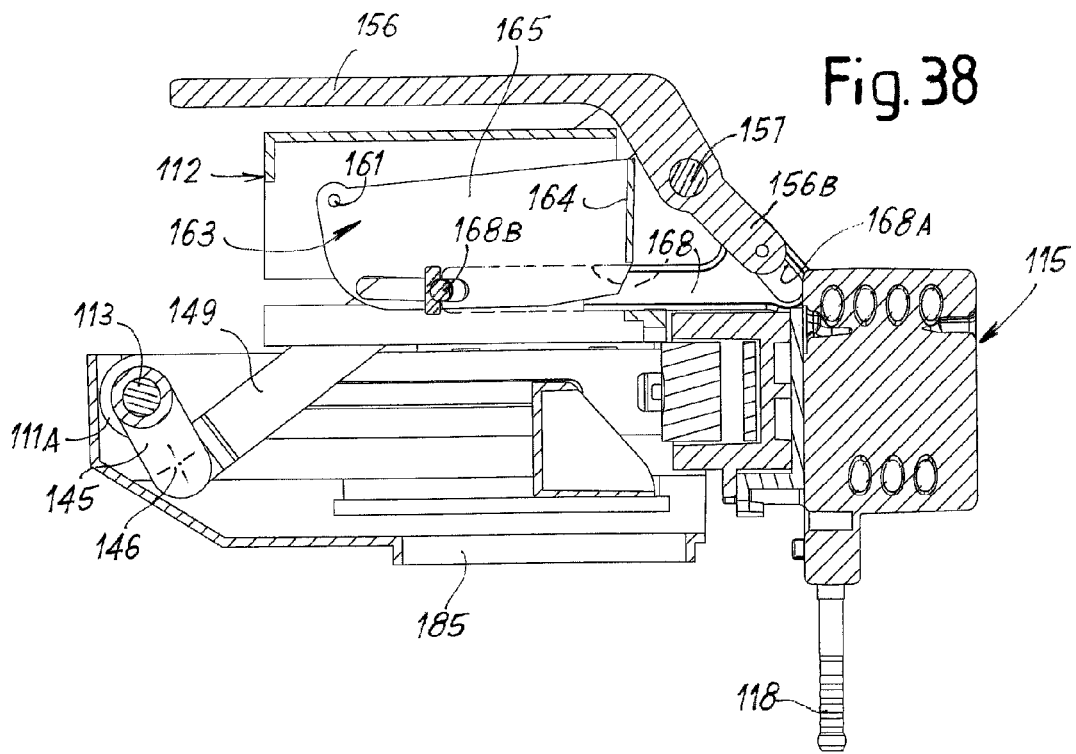
Figure 41:
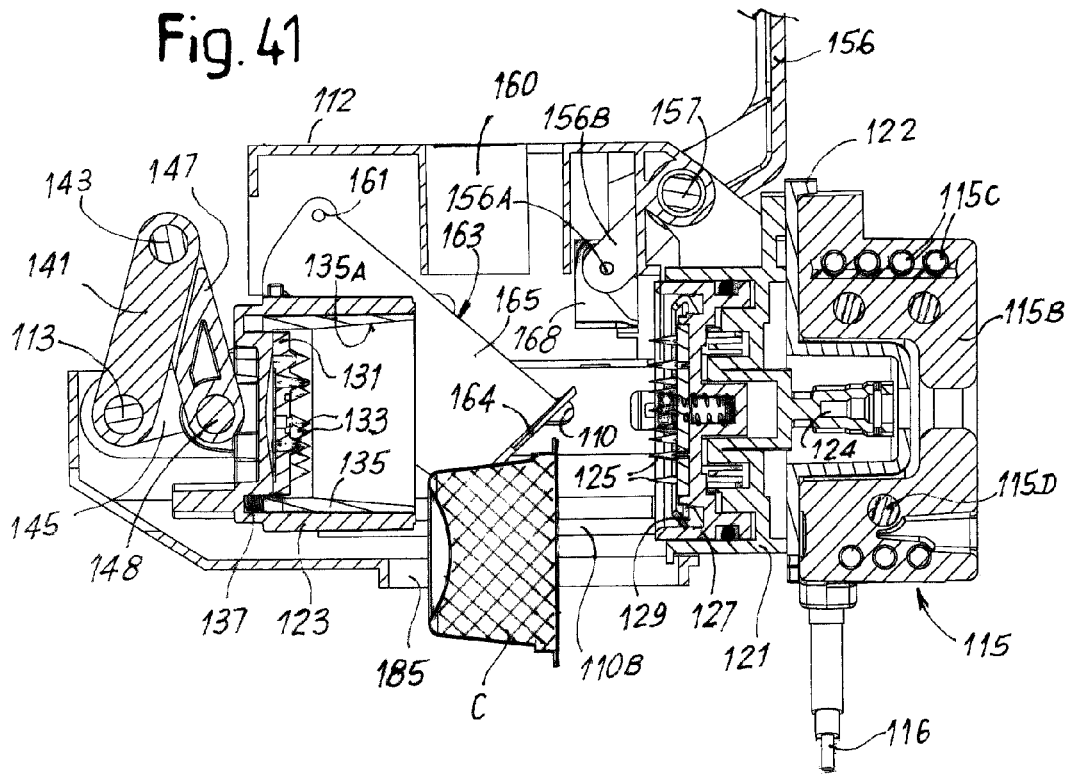
FIGS. 41 and 42 show cross sections according to lines XLI-XLI and XLII-XLII of FIG. 39, respectively.
Figure 42:
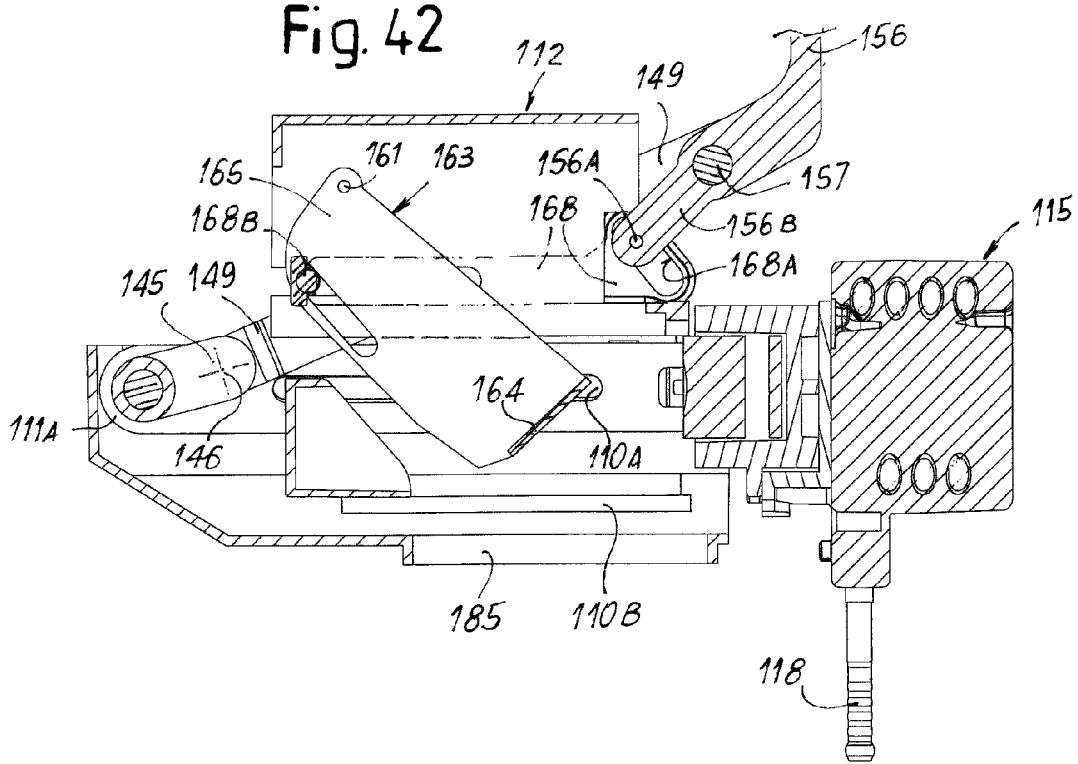

At this stage the mobile deviator 163 is in such a position that the capsule C, by meeting the chute 164, is deviated with the bottom thereof towards the brewing recess 123R formed in the interior of the mobile brewing chamber portion 123, as shown in FIG. 29. Before closing the brewing unit 102 by actuating the lever 156, the capsule C is retained in this position by resting with the top surface thereof against the chute 164 of the mobile deviator 163 and with the side wall thereof against the edge of the mobile brewing chamber portion 123.

By moving the control lever 156 downwards the brewing chamber is closed. FIGS. 31 to 34 show the brewing chamber 121, 123 approaching its closed position, while FIGS. 35-38 show the brewing unit with the brewing chamber in the closed position ready to start the brewing cycle. During the closing motion the mobile deviator 163 is gradually lifted and clears the area where the mobile brewing chamber portion 123 moves while approaching the fixed brewing chamber portion 121. The lifting pivoting motion around the pin 161 is controlled by the sliders 168 engaging the mobile deviator 163 at projections 168B, acting as followers in the slits 165A, which act as cam profiles.

In the closed position (FIGS. 35-38) the flange F of the capsule C is sealingly engaged between the edge of the mobile brewing chamber portion 123 and the seal 129 of the fixed brewing chamber portion 121. The projections of the perforators 125 and 133 penetrate respectively in the front surface and in the bottom surface of the capsule C allowing hot pressurized water to flow through the capsule and the ingredients contained therein to extract the flavours for the production of the beverage.

Once the brewing cycle has ended, a reverse rotary motion of the control lever 156 opens the brewing chamber 121, 123 as shown in FIGS. 39-42. The mobile deviator 163 is pushed downwards by the sliders 168 such that the chute 164 of the mobile deviator 163 pushes against the capsule C. The latter is ejected or at least partially removed from the brewing recess 123R of the mobile brewing chamber portion 123 by the elastic thrust exerted by the spring 137 on the hollow member 135, thus avoiding that the capsule C remains inside the mobile brewing chamber portion 123. The push exerted on the upper side on the capsule C by the mobile deviator 163 avoids that the capsule C can remain adhering to the fixed brewing chamber portion 121. The exhausted capsule C is thus reliably discharged by gravity. The exhausted capsule C passes through an opening 185 provided in the outer shell 111 and is discharged in a collecting department from which it is then removed by the user.

Embodiment of FIGS. 43-46

FIGS. 43-46 show a further embodiment of a brewing unit according to the invention.

The brewing unit, labelled 302 as a whole, comprises a fixed shell 310 and a block 312 arranged on top of said fixed shell 310 and constrained thereto. The fixed shell 310 and the block 312 are mounted in a fixed position inside a coffee machine, such as coffee machine 1 in FIG. 20. The shell 310 encloses two portions of a brewing chamber and houses a structural frame which surrounds the brewing chamber and on which the forces generated inside the brewing chamber during the brewing process are discharged.

In some embodiments the structural frame includes two lateral tie rods 311. Each tie rod 311 can be made of a metal sheet or any other suitable material.

First ends 311A of the two tie rods 311 are connected to one another by a transverse shaft 313. The opposite second ends 311B of the tie rods 311 are shaped such as to form a connector member for connection to a water heater 315. In some embodiments the ends 311B of the tie rods are provided with a through hole, to provide a mechanical connection to corresponding protrusions 315A provided on the outer surface of the water heater 315.

The two tie rods 311, the shaft 313 and the water heater 315 are structurally connected to form said structural frame which receives the forces generated in the brewing chamber during brewing. The water heater 315 forms therefore a structural component of said frame.

In some embodiments the water heater 315 comprises a main body 315B, e.g. formed by a block made of metal, such as aluminium or an aluminium-based alloy, or other heat-conductive material. The protrusions 315A are preferably formed on the outer side surface of the main body 315B. The main body 315B can be made by pressure die-casting. The protrusions 315A can be formed integrally with the main body 315B in a single die-casting manufacturing step.

In some embodiments, in the main body 315B an electric resistor 315C and a water duct 315D are enclosed. Both the electric resistor 315C and the water duct 315D can be helically wound around an axis of the body 315B of the water heater 315. The connectors of the electric resistor 315D to a power line are labelled 316. The input end of the water duct 315D is connected via a connecting pipe to a water pump (not shown). The output end of the water duct 315D has a connector 318 from which hot pressurized water is fed to the brewing chamber, as will be disclosed later on.

Such a water heater is a so-called instant or flow-through water heater, i.e. one in which a very small amount of water is contained in the helically shaped water duct 315D and wherein the electric resistor 315C is sufficiently powerful to heat the water while it is fed through the water heater 115 during use. In less advantageous embodiments a different water heater can be used instead, such as a boiler with an accumulation vessel in which a larger amount of hot water is maintained at the required temperature by a smaller resistor.

Also in this embodiment the water heater forms a structural component of the frame supporting the brewing chamber. Different designs are possible, e.g. wherein the water heater does not form part of the structural frame supporting the brewing chamber.

In some embodiments the brewing chamber comprises two portions. In the embodiment shown in FIGS. 43-46 the brewing chamber includes a first brewing chamber portion 321 and a second brewing chamber portion 323. In some embodiments the first brewing chamber portion 321 is mounted fixed with respect to the frame including the tie rods 311, the shaft 313 and the water heater 315. Preferably the first brewing chamber portion 321 is in heat-contact with the body of the water heater 315, for example attached to or supported by the water heater 315. The first brewing chamber portion forms a brewing recess wherein the capsule C is introduced as disclosed here below.

In the embodiment shown in FIGS. 43-46 the first brewing chamber portion 321 is housed in a seat 322 rigidly constrained to the body of the water heater 315. The seat 322 can be formed integrally with the body 315B of the water heater 315, e.g. it can be manufactured with the remaining part of the body 315B and with the protrusions 315A in a single moulding or die casting manufacturing step. The water heater 315 is thus in heat contact with the brewing chamber portion 321 through said seat 322. Heat contact means that heat can be transmitted from the main body 315B of the water heater 315 to the brewing chamber portion 321 by conduction, such that the water heater 315 can keep the brewing chamber portion 321 at a temperature above ambient temperature due to heat conduction.

The second brewing chamber portion 323 is movable with respect to the first brewing chamber portion 321 according to the double arrow f323 along a direction substantially parallel to the axis A-A of the brewing chamber.

One or both said brewing chamber portions can be provided with perforation means to perforate a capsule C containing the ingredients for producing the coffee beverage or any other edible product by infusion.

In the embodiment shown in the drawings the movable brewing chamber portion 323 is provided with perforators 325 extending through holes provided in a disc member 327 slidably arranged in the movable brewing chamber portion 323. The disc member 327 is provided with a sealing ring 329 co-acting with an annular edge of the opposite fixed brewing chamber portion 321. When the brewing chamber is closed, the capsule C is housed in the brewing recess formed in the brewing chamber portion 321 and the brewing cycle starts, hot water flowing from the water heater 315 and exiting the connector 318 enters the brewing chamber through a duct 324 from the side of the movable brewing chamber portion 323. A flexible pipe 318A connects the duct 324 and the connector 318, allowing the closing and opening movement of the two brewing chamber portions. The pressurized hot water flows through the holes provided in the disk member 327 and enters the capsule C through apertures punched in the top surface of the capsule by the perforators 325.

Springs (not shown) push the disc member 327 away from the bottom of the housing formed by the outer substantially cylindrical wall of the movable brewing chamber portion 323, such as to remove the capsule C from the perforators 325 after brewing has taken place.

The fixed brewing chamber portion 321 is cup-shaped and near the bottom thereof a plate 331 is arranged, which is provided with perforating protrusions 333. The protrusions 333 are apertured such that the beverage extracted from the ingredients contained in the brewing chamber exits the brewing chamber through passages extending along the protrusions 333 and is dispensed through a dispensing duct 334.

A substantially cylindrical hollow member 335 can be housed inside the brewing recess of the movable chamber portion 323. The cylindrical hollow member 335 can be provided with an inner wall 335A having a shape reproducing the shape of the outer side surface of the capsule C, in the illustrated example an approximately frustum-conical shape.

The hollow member 335 is elastically biased by a spring 337 arranged between the cylindrical hollow member 335 and the bottom of the fixed brewing chamber portion 321. Said cylindrical hollow member 335 acts as an ejector to eject the capsule C from the inside of the fixed brewing chamber portion 321 after brewing.

The dispensing duct 334, from which the beverage is dispensed extends across the body 315B of the water heater 315. Preferably, the body 315B of the water heater 315 is axially hollow as shown at 315E and has a front through hole 315F such that the dispensing duct 334 can be connected to a beverage dispensing spout 5A of the machine in which the brewing unit is arranged.

This special arrangement ensures that the dispensing duct 334 is heated up and is brought at an above-ambient temperature even before the first brewing cycle is performed. Heating of the dispensing duct 334 is achieved by heat convection from the water heater 315. The intimate contact between the fixed brewing chamber portion 321 and the body 315B of the water heater 315 is such that the larger one of the two brewing chamber portions is heated by the same resistor which heats the brewing water before the brewing cycle starts. Both measures results in a hot beverage being dispensed already from the very first beverage portion dispensed by the brewing unit 302.

The use of two perforators to perforate the bottom surface and the top surface of a capsule C is not mandatory. However providing two perforators allows the use of sealed capsules, made of plastic, metallic sheet or other suitable material. The possibility of omitting one or the other, or both perforators, is not excluded.

While the fixed brewing chamber portion 321 is fixedly supported on the water heater 315, the movable brewing chamber portion 323 is slidingly supported within the frame formed by the water heater 315, the tie rods 311 and the shaft 313. More specifically, the movable portion 323 of the brewing chamber can be provided with pairs of laterally projecting pins 323A which are slidably engaged into slots 310A of the outer shell 310. The pins 323A have an elongated cross-section such that a pair of such pins is sufficient to conveniently guide the movable brewing chamber portion 323 avoiding tilting thereof.

The movement of the movable brewing chamber portion 323 is controlled by a crank 341 hinged about the shaft 313 and pivoted at 343 to a corresponding pair of rods 347. The rods are in turn hinged at 348 to the movable brewing chamber portion 323. The movement of the brewing chamber portion 323 can be controlled by means of a tie rod 349 hinged at 343 at the pivot which connects the crank 341 and the rods 347. The tie rod 349 is in turn pivoted at 350 to a control lever 356 pivotally engaged at 357 to the shell 310.

The rotation of the control lever 356 about the hinge 357 according to double arrow f356 causes the rotation of the crank 341 about the shaft 313. The rotary motion of the crank 341 is transformed by the crank-rod connection 341-347 into a translation motion of the movable brewing chamber portion 323.

Other kinds of actuating mechanisms can be used to control the closing and opening of the brewing chamber. For example an electric motor or a hydraulic or pneumatic actuator can be used, which acts for example on a shaft controlling the movement of the crank 341.

According to the embodiment shown in FIGS. 43-46 the capsule C is introduced into the brewing chamber by gravity. For that purpose, an aperture or slot 360 is provided on a top surface 312A of the block 312. The capsule C is caused to fall according to arrow F1 (FIG. 44) through the aperture or slot 360.

When the brewing chamber is in its open position (FIGS. 43, 44), a mobile deviating member 363 hinged by means of a pin 361 to the upper block 312 is arranged underneath said aperture 360. The pivoting pin 361 is preferably parallel to the shaft 313 and to the pivoting axes of the transmission members 356, 349, 347, 341 described above and orthogonal to the direction f323 of the closing and opening motion of the brewing chamber.

As explained in more detail hereinafter, the mobile deviator 363 aims at guiding and deviating a capsule C towards the inside of the fixed brewing chamber portion 321 and to favour the discharge, i.e. the ejection of the exhausted capsule C after brewing.

The rotation motion according to the double arrow f363 of the mobile deviator 363 around the pin 361 can be imparted preferably by the lever 356. In the illustrated embodiment, this motion is obtained by means of a connecting member between the control lever 356 and the mobile deviator 363. The connection member can comprise a pair of connection rods 368 pivoted at 368A to the control lever 356 and at 368B to an appendage 363A of the mobile deviator 363. The rotary movement of the control lever 356 causes therefore also a pivoting movement of the mobile deviator 363. The latter can take up two end positions, shown in FIGS. 44 and 46 respectively, corresponding to the open position and closed position of the brewing chamber, respectively.

In the first position, the mobile deviator 363 is arranged under the aperture or slot 360 such that the capsule C introduced through the slot 360 is deviated by the mobile deviator 363 towards the fixed portion 321 of the brewing chamber. In the second position (FIG. 46) the mobile deviator 363 is placed above the brewing chamber. The movement of the mobile deviator 363 controlled by lever 356 is phased such that mobile deviator is moved away from the path of the movable brewing chamber portion 323 in advance of the closure of the brewing chamber, such as not to interfere with the closing movement.

Figure 43:
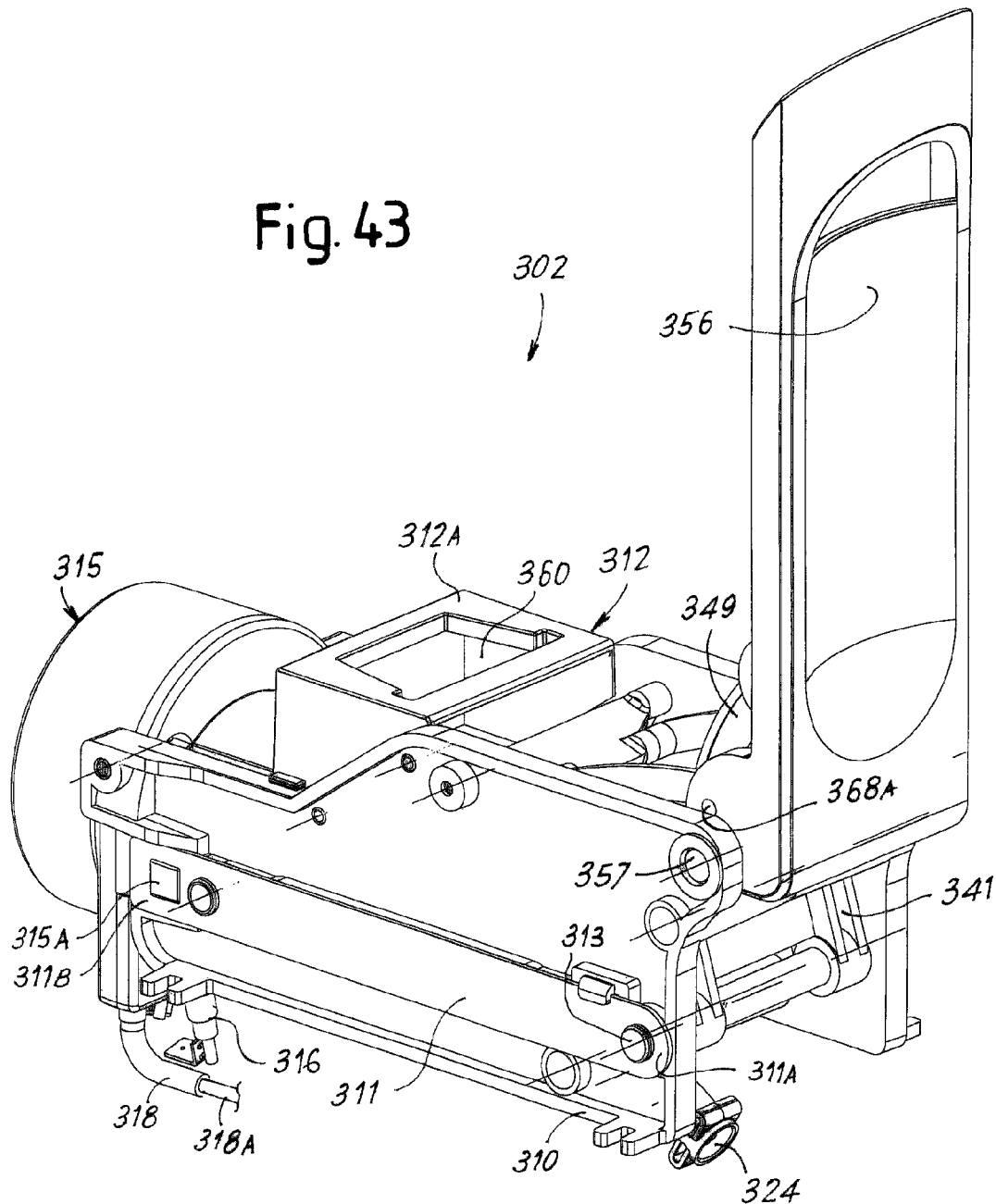
FIG. 43 shows a perspective view of a brewing unit according to a further embodiment.
Figure 44:
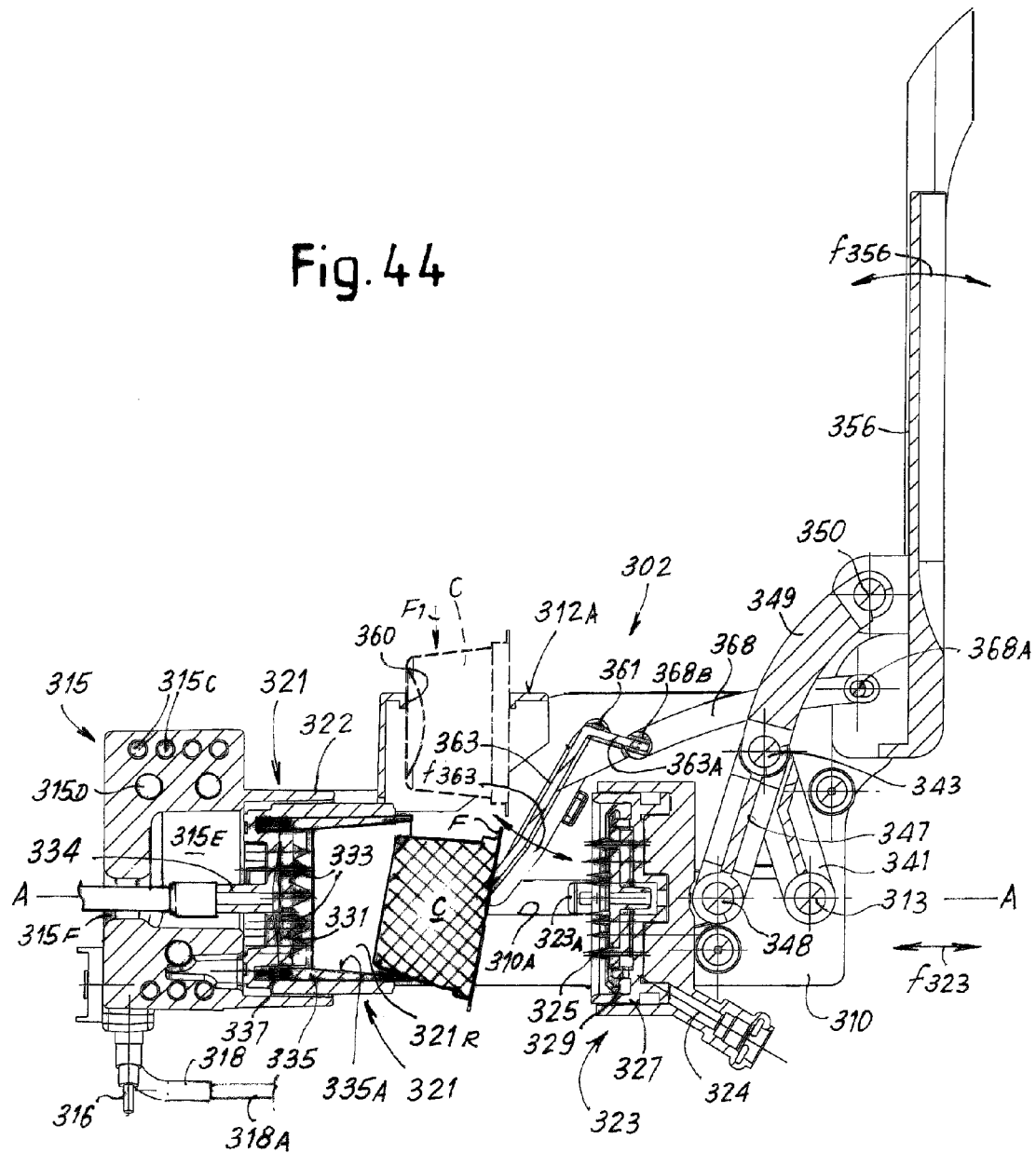
FIG. 44 shows a section of the brewing unit of FIG. 43 according to a vertical longitudinal plane.

The operation of the brewing unit 302 described so far is as follows. In FIGS. 43 and 44 the brewing unit 302 is open. The aperture 360 is accessible for the introduction of a capsule C in the brewing unit. The capsule C falls by gravity into the brewing unit 302, reaching the position shown in solid line in the cross section of FIG. 44. During its falling movement the capsule C meets the chute mobile deviator 363 and is stopped thereby. The mobile deviator 363 is in a position such that the capsule C, by meeting the mobile deviator 363, is deviated with the bottom thereof towards the brewing recess 321R formed in the interior of the fixed brewing chamber portion 321. The capsule C thus comes to rest with the side surface thereof against the edge of the hollow member 335 or against the edge of the movable brewing chamber portion 321. The capsule C is retained in this position by the deviator member 363 until the brewing unit is closed acting on the control lever 356.

Figure 45:
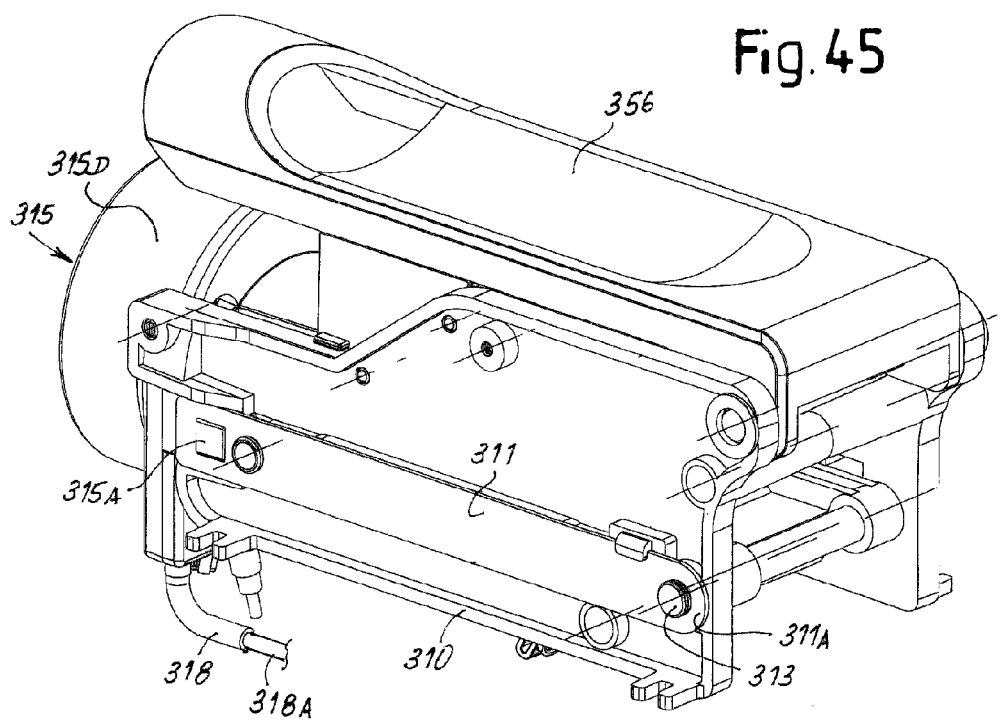
FIG. 45 shows a perspective view similar to FIG. 43 with the brewing unit in a closed position.
Figure 46:
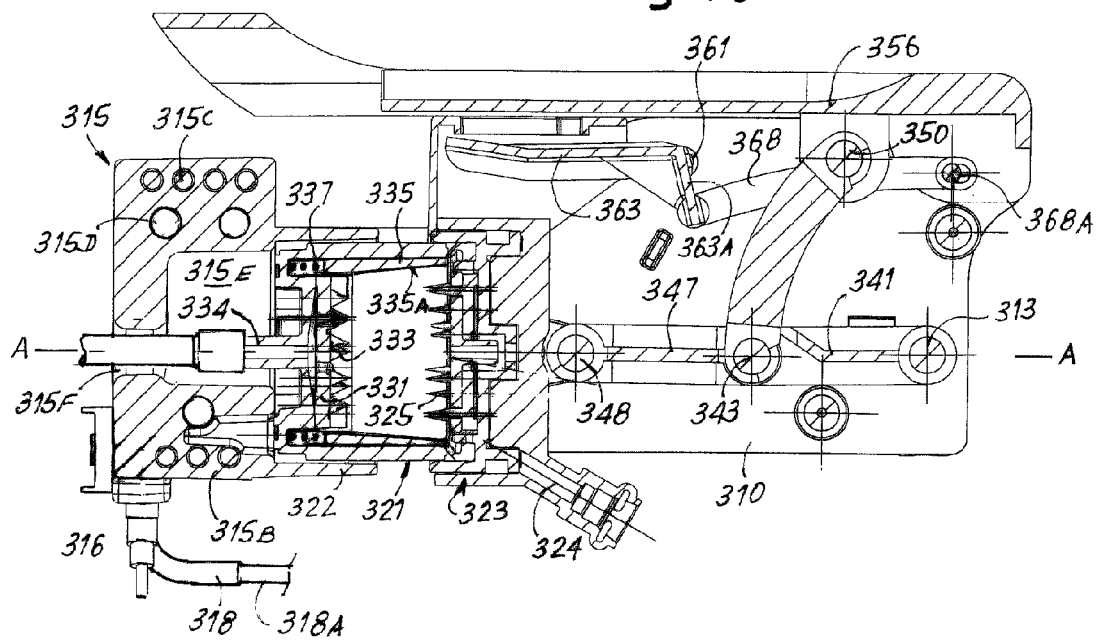
FIG. 46 shows a section of the brewing unit in a closed position.

By actuating the control lever 356 downwards, the brewing chamber is closed (FIGS. 45, 46). During the closing motion the mobile deviator 363 is gradually lifted and clears the area where the mobile brewing chamber portion 323 moves approaching the fixed brewing chamber portion 321. The lifting pivoting motion around the pin 361 is controlled by the control lever 356 via rods 368. Before clearing the space between the brewing chamber portions 321, 323 the mobile deviator 363 pushes the capsule C inside the brewing recess 321 R.

In the closed position the flange F of the capsule C is sealingly engaged between the edge of the fixed brewing chamber portion 321 and the seal 329 of the mobile brewing chamber portion 323. The projections of the perforators 325 and 333 penetrate respectively in the front surface and in the bottom surface of the capsule C allowing hot pressurized water to flow through the capsule and the ingredients contained therein to extract the flavours for the production of the beverage.

Once the brewing cycle has ended, with a reverse rotary motion of the control lever 356 the brewing chamber 321, 323 is opened again. The mobile deviator 363 is pushed downwards by the arms 368 such as to push against the capsule C. The latter is ejected or at least partially taken off from the recess 321R of the fixed brewing chamber portion 321 by the elastic thrust exerted by the springs 337 on the hollow member 335, thus preventing the capsule C from remaining inside the fixed brewing chamber portion 321. The downwards thrust exerted on the upper side on the capsule C by the mobile deviator 363 prevents the capsule C from remaining attached to the mobile brewing chamber portion 323 or the fixed brewing chamber portion 321. The exhausted capsule C is thus reliably discharged by gravity.

Embodiments of FIGS. 47 to 52

A further embodiment of a brewing unit according to the invention is shown in FIGS. 47-52. In these figures only the brewing chamber portions, the mechanical components for controlling opening and closing of the brewing chamber and the devices for handling the capsule are shown. The outer frame, the guides and other auxiliary parts of the brewing unit are omitted for the sake of clarity of the drawings. Members, components or elements corresponding to those of the embodiment shown in FIGS. 43 to 46 are labeled with the same reference numbers increased by "100". So, for example, the actuating lever of the embodiment illustrated in FIGS. 47 to 52 is labeled 456 and corresponds to the actuating lever 356 of the embodiment illustrated in FIGS. 43 to 46.

The brewing unit, labelled 402 as a whole, comprises a fixed frame (not shown) supporting a brewing chamber. The frame can be designed as disclosed in connection with the previously described embodiments. Additionally, the brewing unit can include a water heater, which can e.g. be arranged on the left-hand side in FIGS. 47-50. The water heater can be an instant water heater, i.e. a flow-through water heater as mentioned above.

In the embodiment shown in FIGS. 47-52 the brewing chamber includes a first brewing chamber portion 421 and a second brewing chamber portion 423. The first brewing chamber portion 421 forms a brewing recess 421A, wherein a capsule C containing beverage ingredients is introduced. In this embodiments the first brewing chamber portion 421 is fixedly supported by the frame. Preferably the first brewing chamber portion 421 is in heat-contact with the body of the water heater, for example attached to or supported by the water heater.

The second brewing chamber portion 423 is movable with respect to the first brewing chamber portion 421 according to the double arrow f423 along a direction substantially parallel to the axis A-A of the brewing chamber. One or both said brewing chamber portions 421, 423 can be provided with perforation means to perforate a capsule C.

The movable brewing chamber portion 423 is provided with perforators 425 extending through holes provided in a disc member 427 slidably arranged in the movable brewing chamber portion 423. The a sealing ring 429 surrounds the disc member 427 and is arranged to co-act with an annular edge of the opposite fixed brewing chamber portion 421. When the brewing chamber is closed and the brewing cycle starts, hot water flowing from the water heater enters the brewing chamber through a duct 424 from the side of the movable brewing chamber portion 423. The pressurized hot water flows through the holes provided in the disk member 427 and enters the capsule C through apertures punched in the top surface of the capsule by the perforators 425.

Springs (not shown) push the disc member 427 away from the bottom of the housing formed by the outer substantially cylindrical wall of the movable brewing chamber portion 423, such as to remove the capsule C from the perforators 425 after brewing has taken place.

The fixed brewing chamber portion 421 is cup-shaped and near the bottom thereof a plate 431 is arranged, which is provided with perforating protrusions 433. The protrusions 433 are apertured such that the beverage exits the brewing chamber through passages extending along the protrusions 433 and is dispensed through a dispensing duct 434.

A substantially cylindrical hollow member 435 can be housed inside the brewing recess of the movable chamber portion 423. The cylindrical hollow member 435 can be provided with an inner wall 435A having a shape reproducing the shape of the outer side surface of the capsule C, in the illustrated example an approximately frustum-conical shape. The hollow member 435 is elastically biased by a spring 437 arranged between the cylindrical hollow member 435 and the bottom of the fixed brewing chamber portion 421. Said cylindrical hollow member 435 acts as an ejector to eject the capsule C from the inside of the fixed brewing chamber portion 421 after brewing.

The movement of the movable brewing chamber portion 423 is controlled by a crank 441 hinged about a shaft 413 and pivoted at 443 to a corresponding pair of rods 447. The rods are in turn hinged at 448 to the movable brewing chamber portion 423. The movement of the brewing chamber portion 423 can be controlled by means of a tie rod 449 hinged at 443 to the pivot which connects the crank 441 and the rods 447. The tie rod 449 is in turn pivoted at 450 to a control lever 456 pivotally engaged at 457 to the stationary frame.

The rotation of the control lever 456 about the hinge 457 according to double arrow f456 causes the rotation of the crank 441 about the shaft 413. The rotary motion of the crank 441 is transformed by the crank-rod connection 441-447 into a translation motion (f423) of the movable brewing chamber portion 423.

Other kinds of actuating mechanisms can be used to control the closing and opening of the brewing chamber. For example an electric motor or a hydraulic or pneumatic actuator can be used, which acts for example on a shaft controlling the movement of the crank 441.

According to the embodiment shown in FIGS. 47-52 the capsule C is introduced into the brewing chamber by gravity. For that purpose, an aperture or slot is provided on a top surface of the coffee machine wherein the brewing unit 402 is arranged. The capsule C is caused to fall according to arrow F1 (FIG. 47) towards the brewing unit 402.

When the brewing chamber is in its open position (FIGS. 47, 51), a mobile deviator 463 hinged by means of a pin 461 to the stationary frame of the brewing unit (not shown) is arranged underneath the inlet aperture through which the capsule is C caused to fall by gravity. The pivoting pin 461 is preferably parallel to the shaft 413 and to the pivoting axes of the transmission members 456, 449, 447, 441 described above and orthogonal to the direction f423 of the closing and opening motion of the brewing chamber.

As explained in more detail hereinafter, the mobile deviator 463 aims at guiding and deviating a capsule C towards the fixed brewing chamber portion 421 and to favour the discharge, i.e. the ejection of the exhausted capsule C after brewing.

The rotation motion according to the double arrow f463 of the mobile deviator 463 around the pin 461 can be imparted preferably by the control lever 456. In the illustrated embodiment, this motion is obtained by means of a connection member between the control lever 456 and the mobile deviator 463. The connection member can comprise a pair of connection rods 468 pivoted at 468A to the control lever 456 and at 468B to an appendage 463A of the mobile deviator 463. The rotary movement of the control lever 456 causes therefore also a pivoting movement of the mobile deviator 463. The latter can take up two end positions, shown in FIGS. 47, 51 and in FIGS. 50, 52, corresponding to the open position and closed position of the brewing chamber, respectively.

In the first position, the mobile deviator 463 is arranged under the entry aperture or slot through which the capsule C is introduced in the brewing unit, the brewing chamber being open, such that the capsule C is deviated by the mobile deviator 463 towards the fixed brewing chamber portion 421. In the second position (FIG. 50, 52) the mobile deviator 463 is placed above the brewing chamber, the latter being closed. The movement of the mobile deviator 463 controlled by control lever 456 is phased such that mobile deviator is moved away from the path of the movable brewing chamber portion 423 in advance of the closure of the brewing chamber, such as not to interfere with the closing movement.

Figure 51:
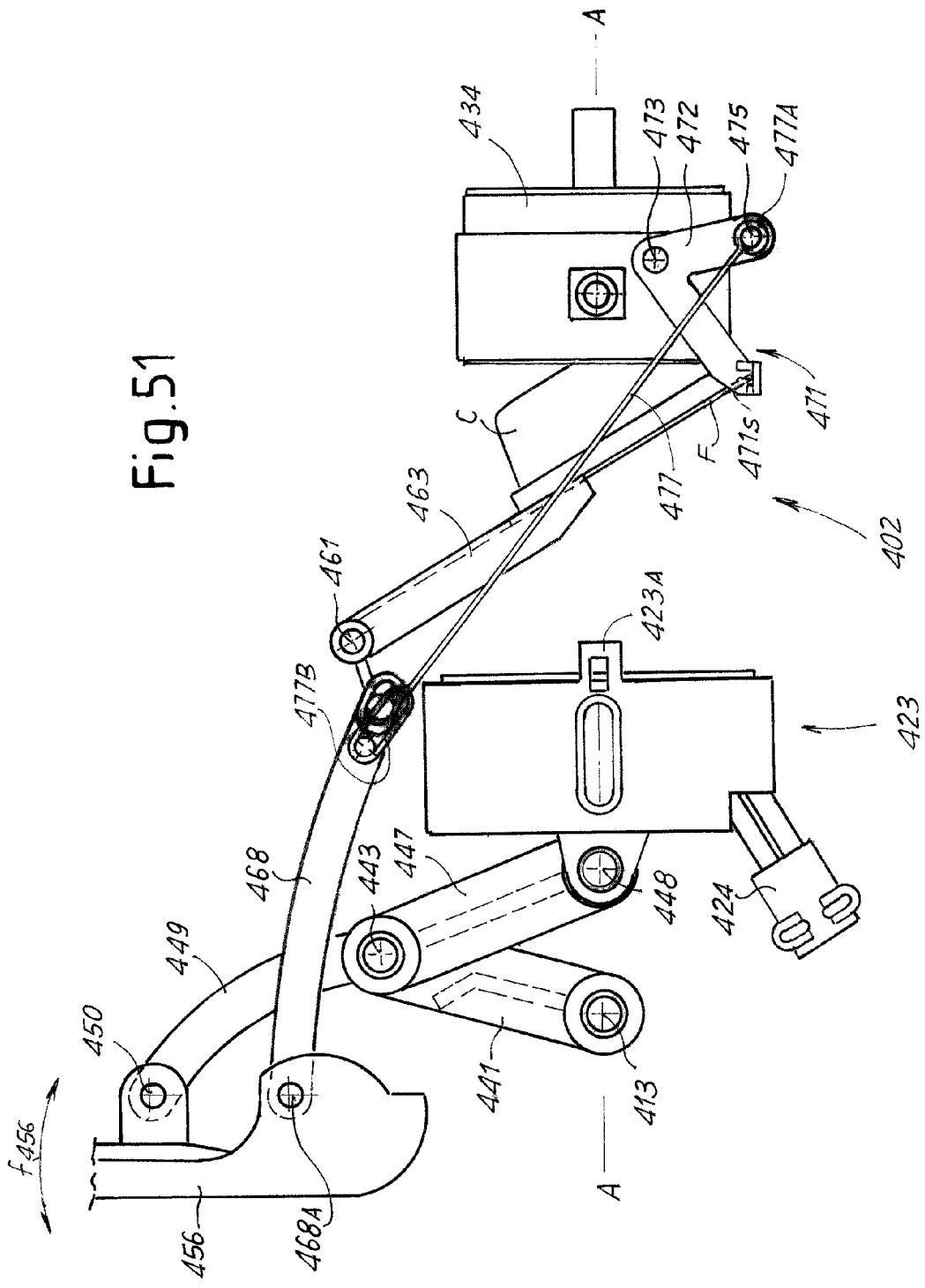
FIGS. 51 and 52 show a side view of the brewing unit according to FIGS. 47-50 in the open position and closed position of the brewing chamber, respectively.
Figure 52:
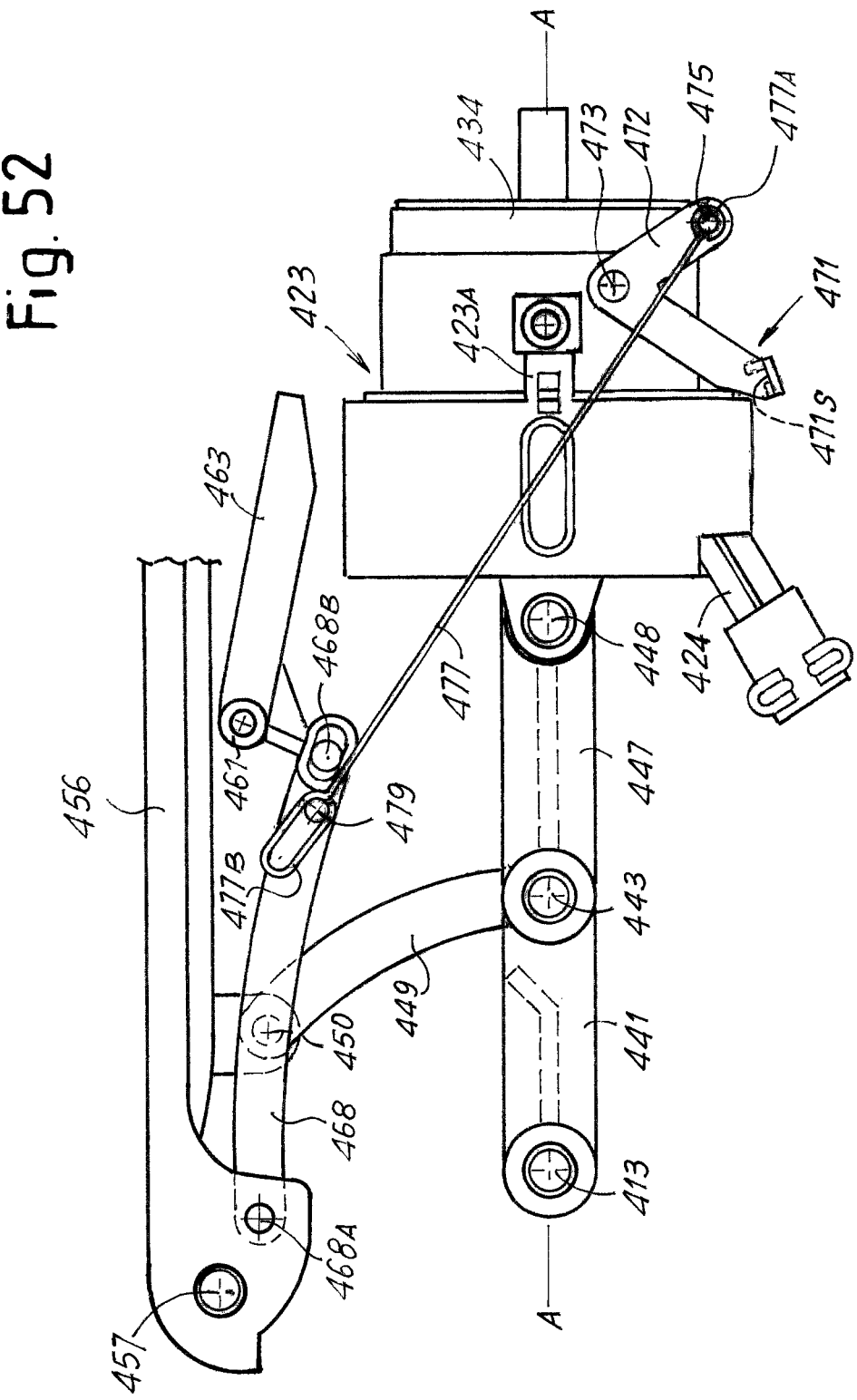

The mobile deviator 463 co-acts with a movable capsule supporting member 471 associated to the fixed brewing chamber portion 421. As best shown in FIGS. 51 and 52, in this embodiment the movable capsule supporting member 471 is provided with two approximately L-shaped arms 472 (only one of which is visible in FIGS. 51 and 52). Both L-shaped arms 472 are centrally pivoted at 473 around a common axis to the fixed brewing chamber portion 421. Respective first ends of the L-shaped arms 472 are integral with a seat 471S. The seat 471S is intended to receive and retain the lower portion of the flange F of a capsule C upon insertion of the capsule and before the brewing chamber closes. As best shown in FIGS. 47 and 51, when the brewing chamber is open, the capsule C is supported by the mobile deviator 463 and by the movable capsule supporting member 471. More specifically, the top surface of the capsule C, surrounded by the flange F, rests against the mobile deviator 463. The lower portion of the flange F rests in the seat 471S of the movable capsule supporting member 471. In this embodiment, therefore, the capsule C does not contact the brewing chamber until the closing movement of the brewing unit starts.

The movement of the movable capsule supporting member 471 is synchronized with the closing movement of the brewing chamber and thus of the mobile deviator 463 as follows. The movable capsule supporting member 471 is connected by means of a mechanical connection to the actuating mechanism, which closes and opens the brewing chamber. In this embodiment said actuating mechanism is formed by the control lever 456. More specifically, in the embodiment shown in the drawings, the second end of each L-shaped arms 472 is hinged at 475 to a respective rod 477. Each rod 477 is provided at a first end thereof with a first eyelet 477A engaged at 475 to the respective L-shaped arm 472. The opposite, second end of each rod 477 is provided with an elongated eyelet 477B slidingly and pivotally engaged with a pin 479 integral with the corresponding connection rod 468. The latter is in turn connected to the control lever 456. Therefore, rotation of the control lever 456 causes, via connection rods 468 and rods 477, a pivoting movement of the movable capsule supporting member 471 around pivots 473. The elongated eyelets 477B of the two rods 477 allow a difference in phase of the movement of the rods 477 with respect to the movement of the control lever 456.

The operation of the brewing unit 402 described so far is as follows. In FIG. 47 the brewing unit 402 is open. A capsule C has been introduced by gravity into the brewing unit 402 and is supported by the mobile deviator 463 and the movable capsule supporting member 471, clear of the brewing chamber portions 421, 423. The mobile deviator 463 and the movable capsule supporting member 471 are arranged in a position such that the capsule C, by meeting the mobile deviator 463, is deviated with the bottom thereof towards the brewing recess formed in the interior of the fixed brewing chamber portion 421, without getting in contact with the brewing chamber portion 421. The capsule C is retained in this position until the brewing unit is closed acting on the control lever 456.

Figure 49:
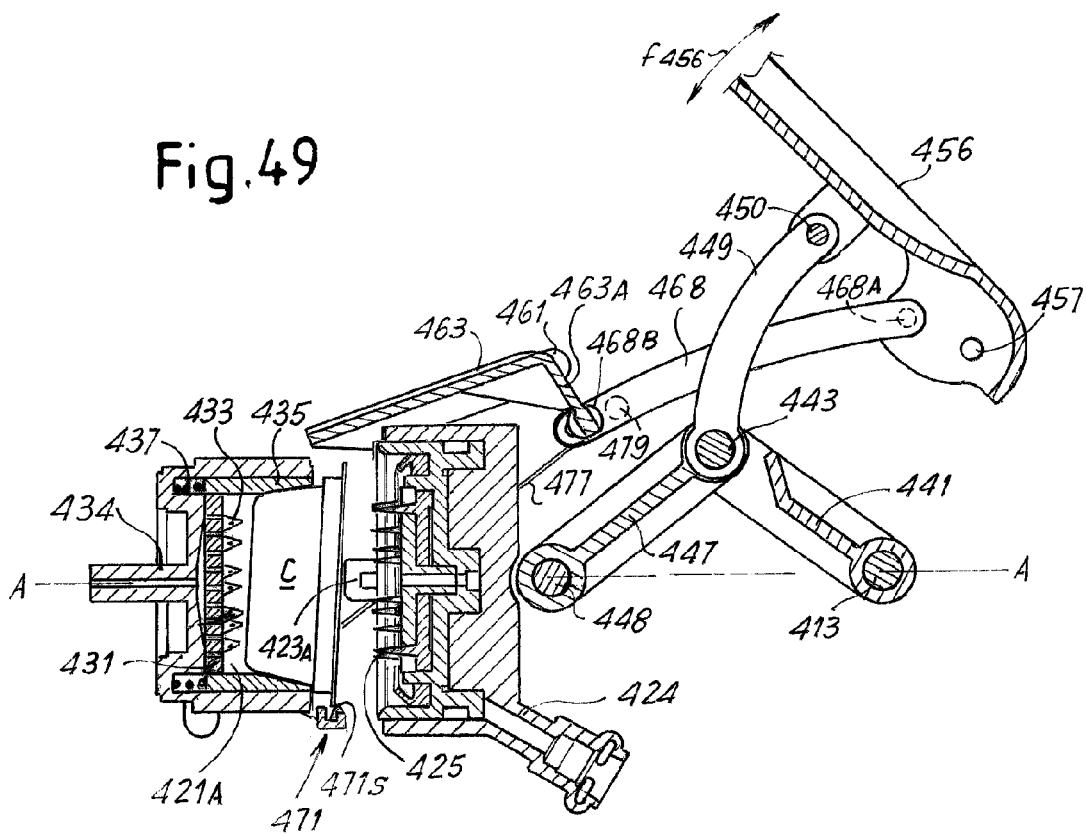

By actuating the control lever 456 downwards (arrow f456, FIG. 48), the brewing chamber is closed. The closing movement is shown in FIGS. 47, 48 and 49. During the closing motion the mobile deviator 463 is gradually lifted and clears the area where the mobile brewing chamber portion 423 moves approaching the fixed brewing chamber portion 421. The lifting motion around the pin 461 is controlled by the control lever 456 via rods 468. At the same time, the rods 477 cause the pivoting movement of the movable capsule supporting member 471 around the hinge 473. Due to the elongated shape of the eyelets 477B, the pivoting movement of the movable supporting member 471 is delayed with respect to the movement of the control lever 456, such that the capsule C is properly supported with the flange F retained in seat 471S until the mobile deviator 463 has pushed the capsule into engagement with the fixed brewing chamber portion 421. This is best shown in FIG. 48, where the capsule C has been pushed by the mobile deviator 463 partly into the fixed brewing chamber portion 421, while the movable capsule supporting member 471 is still in its starting position.

Figure 50:
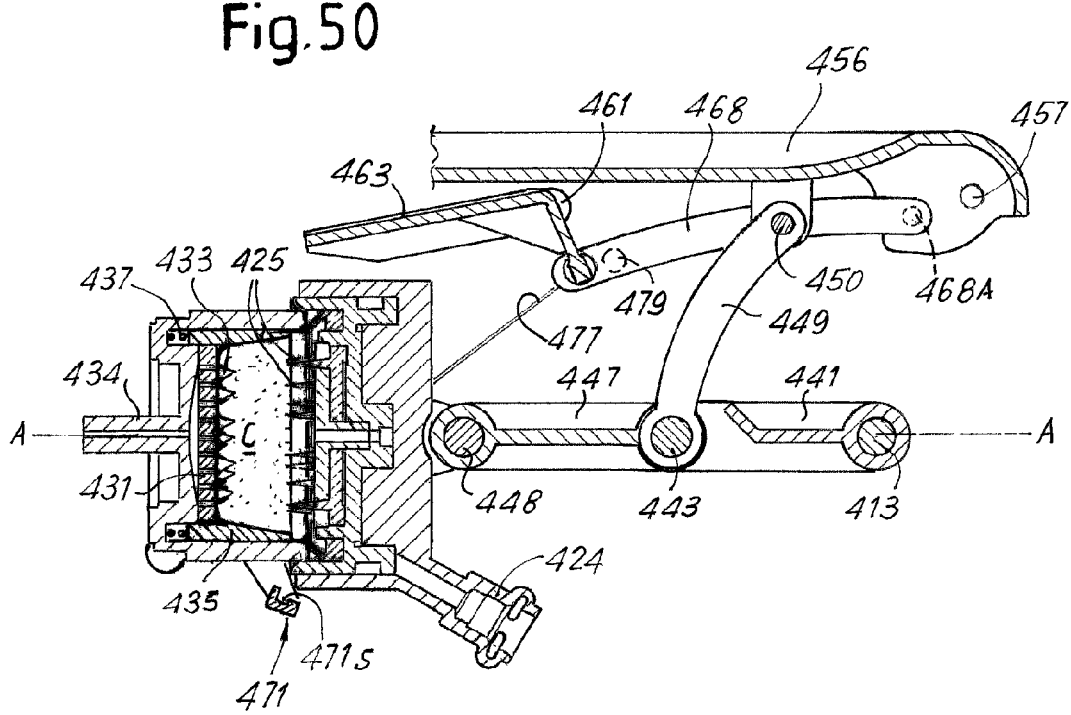

As shown in FIGS. 49 and 50, the movable capsule supporting member 471 is then cleared off, thus allowing closure of the brewing chamber.

In the closed position the flange F of the capsule C is sealingly engaged between the edge of the fixed brewing chamber portion 423 and the seal 429 of the mobile brewing chamber portion 423. The projections of the perforators 425 and 433 penetrate respectively in the front surface and in the bottom surface of the capsule C allowing hot pressurized water to flow through the capsule to extract the flavours from the ingredients contained in the capsule.

Once the brewing cycle has ended, with a reverse rotary motion of the control lever 456 the brewing chamber 421, 423 is opened again. The mobile deviator 463 is pushed downwards by the connection rods 468 such as to push from the top against the capsule C. The latter is ejected or at least partially removed from the brewing recess formed in the fixed brewing chamber portion 421 by the resilient force exerted by the springs 437 on the hollow member 435, thus preventing the capsule C from remaining inside the fixed brewing chamber portion 421. The push exerted on the upper side on the capsule C by the mobile deviator 463 prevents the capsule C from remaining attached to the mobile brewing chamber portion 423 or the fixed brewing chamber portion 421. The exhausted capsule C is thus reliably discharged by gravity. The movable capsule supporting member 471 is also moved again towards the starting position shown in FIG. 47 by control lever 456 via rods 477. The elongated shape of the eyelets 477B allow for a delay of the return motion of the movable capsule supporting member 471 with respect to the opening movement of the brewing chamber, such as to facilitate the ejection of the spent capsule C towards a collection tray or the like, arranged underneath the brewing chamber 421, 423.

In this embodiment, the control lever is used to actuate the closing movement of the brewing chamber as well as the movement of the mobile deviator and of the movable capsule supporting member. Preferably, as mentioned above, the motion of the mobile deviator and of the movable capsule supporting member is actively controlled by the control lever or by any other actuator used to control the brewing chamber closing and opening movement, also in the reverse phase, when the brewing chamber is opened and the mobile deviator moved back in the capsule-retention and deviation position.

Embodiment of FIGS. 53-57

A further embodiment of a brewing unit according to the invention is shown in FIGS. 53 to 57. Components corresponding to those of the embodiment illustrated in FIGS. 47 to 52 are labelled with the same reference numbers increased by "100".

The brewing unit 502 comprises a fixed frame 504, which houses and supports a brewing chamber. Additionally, the brewing unit includes a water heater 515. Preferably the water heater is a flow-through heater, including a water heater body wherein a heating electric resistance 515C and a water duct 515D are embedded.

In the embodiment shown in FIGS. 53-57 the brewing chamber includes a first brewing chamber portion 521 and a second brewing chamber portion 523. A brewing recess 521A is formed in the first brewing chamber portion 521. In this embodiments the first brewing chamber portion 521 is fixed with respect to the frame 504. Preferably the first brewing chamber portion 521 is in heat-contact with the body of the water heater 515, e.g. the first brewing chamber portion 521 is arranged in a seat 522 integrally formed with the body of the water heater 515. The second brewing chamber portion 523 is movable with respect to the first brewing chamber portion 521 according to the double arrow f523 along a direction substantially parallel to the axis A-A of the brewing chamber.

One or both said brewing chamber portions 521, 523 can be provided with perforation means to perforate a capsule C containing the ingredients for producing the coffee beverage, or any other edible product, by infusion. In the embodiment shown in the drawings the movable brewing chamber portion 523 is provided with a single perforator 525 extending through an aperture of a disc member 527 slidably arranged in the movable brewing chamber portion 523. The disc member 527 is provided with a sealing ring 529 co-acting with an annular edge of the opposite fixed brewing chamber portion 521. When the brewing chamber is closed and the brewing cycle starts, hot water flowing from the water heater enters the brewing chamber through a duct 524 from the side of the movable brewing chamber portion 523.

The pressurized hot water flows through the perforator 525 and enters the capsule C through apertures punched in the top surface of the capsule by the perforator 525. A spring 527A pushes the disc member 527 away from the bottom of the housing formed by the outer substantially cylindrical wall of the movable brewing chamber portion 523, such as to remove the capsule C from the perforator 525 after completion of the brewing cycle and opening of the brewing chamber.

The fixed brewing chamber portion 521 is cup-shaped and near the bottom thereof a plate 531 is arranged through which a perforator 533 extends. The perforator 533 has an aperture through which the beverage extracted from the ingredients contained in the brewing chamber exits the brewing chamber and flows into a dispensing duct 534. Preferably, the dispensing duct 534 extends through a cavity 515E of the water heater body and is in fluid communication with a beverage dispensing nozzle (not shown).

A substantially cylindrical hollow member 535 can be housed inside the brewing recess of the movable chamber portion 523. The cylindrical hollow member 535 can be provided with an inner wall 535A having a shape reproducing the shape of the outer side surface of the capsule C, in the illustrated example an approximately frustum-conical shape. The hollow member 535 is elastically biased by a spring 537 arranged between the cylindrical hollow member 535 and the bottom of the fixed brewing chamber portion 521. Said cylindrical hollow member 535 acts as an ejector to push the capsule C away from the bottom of the fixed brewing chamber portion 521 after brewing.

The movable brewing chamber portion 523 is slidingly supported within the frame 504. The movement of the movable brewing chamber portion 523 is controlled by a crank 541 hinged about a shaft 513 and pivoted at 543 to a corresponding pair of rods 547. The rods are in turn hinged at 548 to the movable brewing chamber portion 523. The movement of the brewing chamber portion 523 can be controlled by means of a tie rod 549 hinged at one end thereof to the pivot point 543 between the crank 541 and the rods 547 and at the opposite end 550 to a control lever 556. The control lever 556 is in turn hinged at 557 to the stationary frame 504.

The rotation of the control lever 556 about the hinge 557 according to arrow f556 causes the rotation of the crank 541 about the shaft 513. The rotary motion of the crank 541 is transformed by the crank-rod connection 541-547 into a translation motion (see arrow f523) of the movable brewing chamber portion 523.

Also in this embodiment, other kinds of actuating mechanisms can be used to control the closing and opening of the brewing chamber, such as an electric motor, a pneumatic or hydraulic actuator, or the like.

The capsule C is introduced into the brewing unit by gravity. For that purpose, an aperture or slot 560 is provided in the frame 504.

When the brewing chamber is in its open position (FIGS. 53, 54), a mobile deviating member 563 hinged by means of a pin 561 to the stationary frame 504 is arranged underneath the inlet aperture 506 through which the capsule is C introduced. The pivoting pin 561 is preferably parallel to the shaft 513 and to the pivoting axes of the transmission members 556, 549, 547, 541 and orthogonal to the direction f523 of the closing and opening motion of the brewing chamber.

As explained in more detail hereinafter, the mobile deviator 563 aims at guiding and deviating a capsule C towards the fixed brewing chamber portion 521 and to favour or assist the discharge, i.e. the ejection of the exhausted capsule C after brewing.

In this embodiment, the rotation motion according to the double arrow f563 of the mobile deviator 563 around the pin 561 is imparted by the control lever 556. In the illustrated embodiment, this motion is obtained by means of a connecting member between the control lever 556 and the mobile deviator 563. The connection member comprises a pair of connection rods 568 pivoted at 568A to the control lever 556 and at 568B to an appendage 563A of the mobile deviator 563.

The rotary movement of the control lever 556 causes on the one side the closure of the brewing chamber and on the other side a pivoting movement of the mobile deviator 563. The latter can take up two end positions, shown in FIGS. 53, 54 (when the brewing chamber is entirely open) and in FIG. 57 (when the brewing chamber is entirely closed). In the first position, the mobile deviator 563 is arranged under the entry aperture 560, such that the capsule C falling by gravity in the brewing unit is deviated by the mobile deviator 563 towards the fixed brewing chamber portion 521. In the second position (FIG. 57) the mobile deviator 563 is placed above the brewing chamber. The movement of the mobile deviator 563, controlled by lever 556, is phased such that mobile deviator is moved away from the path of the movable brewing chamber portion 523 in advance of the closure of the brewing chamber, such as not to obstruct the closing movement.

Figure 54:
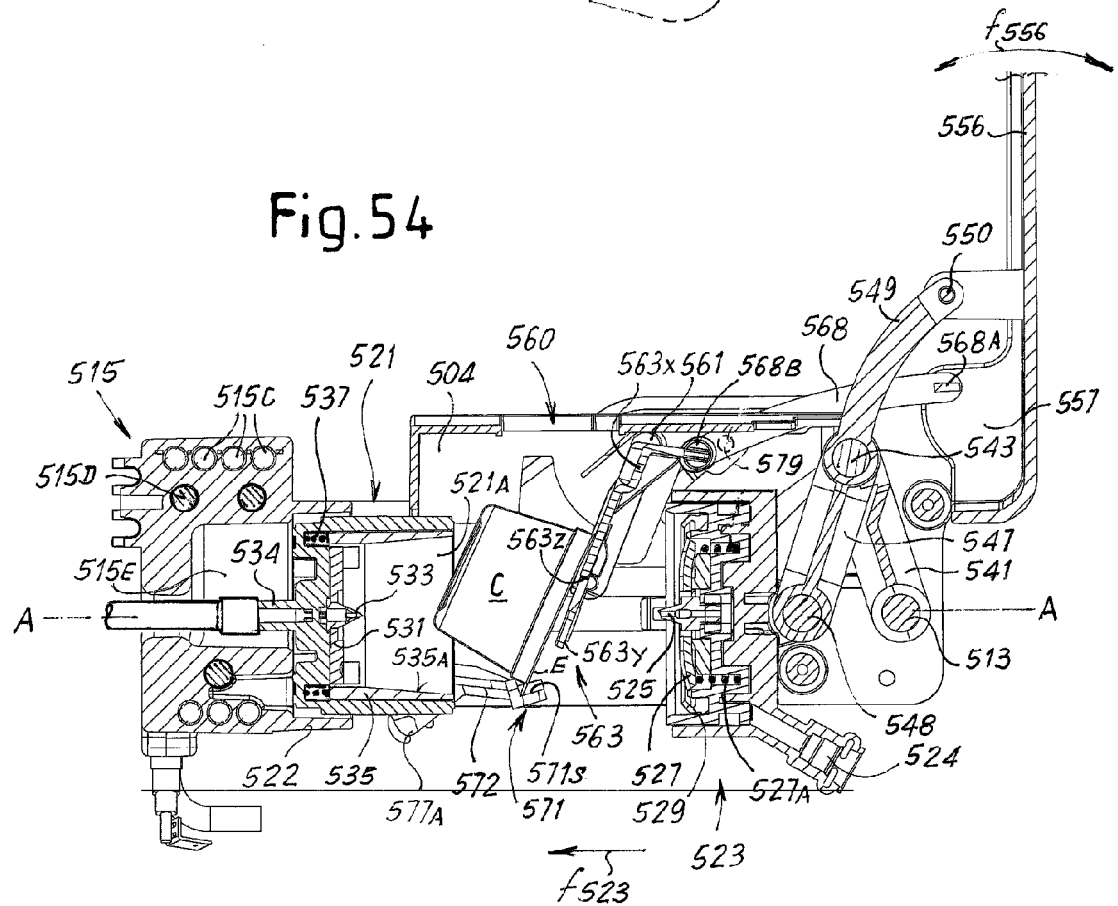

The mobile deviator 563 co-acts with a movable capsule supporting member 571 associated to the fixed brewing chamber portion 521 or to the fixed frame. Said movable capsule supporting member 571 is provided with two approximately L-shaped arms 572 which are centrally pivoted to the fixed brewing chamber portion 521 or to the frame 504. Respective first ends of the L-shaped arms 572 are integral with a seat 571S. The seat 571S is intended to receive and retain the lower portion of the flange F of a capsule C upon insertion of the capsule and before the brewing chamber closes. As best shown in FIG. 54, when the brewing chamber is open, the capsule C is supported by the mobile deviator 563 and by movable capsule supporting member 571. The lower portion of the flange F rests in the seat 571S of the movable capsule supporting member 571.

Similarly as in the embodiment of FIGS. 47-52, also in the embodiment of FIGS. 53-57, once introduced in the brewing unit the capsule C takes a rest position wherein it does not contact the brewing chamber until the closing movement of the brewing unit starts. The capsule contacts the brewing chamber portion 521 only after the closing movement has started, i.e. only after the capsule has left its rest position.

The movement of the movable capsule supporting member 571 is synchronized with the closing movement of the brewing chamber and of the mobile deviator 563 as follows. The second end of each L-shaped arm 572, opposite the seat 571S is hinged at a first end of a respective rods 577. The opposite, second end of each rod 577 is in turn engaged to a pin 579 integral with the corresponding connection rod 568. The latter is in turn connected to the control lever 556, as mentioned above. Therefore, via connection rods 568 and rods 577 the rotation of the control lever 556 causes a pivoting movement of the movable capsule supporting member 571. An elongated eyelet (not shown) can be provided at the second end of each rod 577 to delay the movement of the rods 577 with respect to the movement of the lever 556, for the purposes described with respect to the embodiment of FIGS. 47-52.

Figure 53:
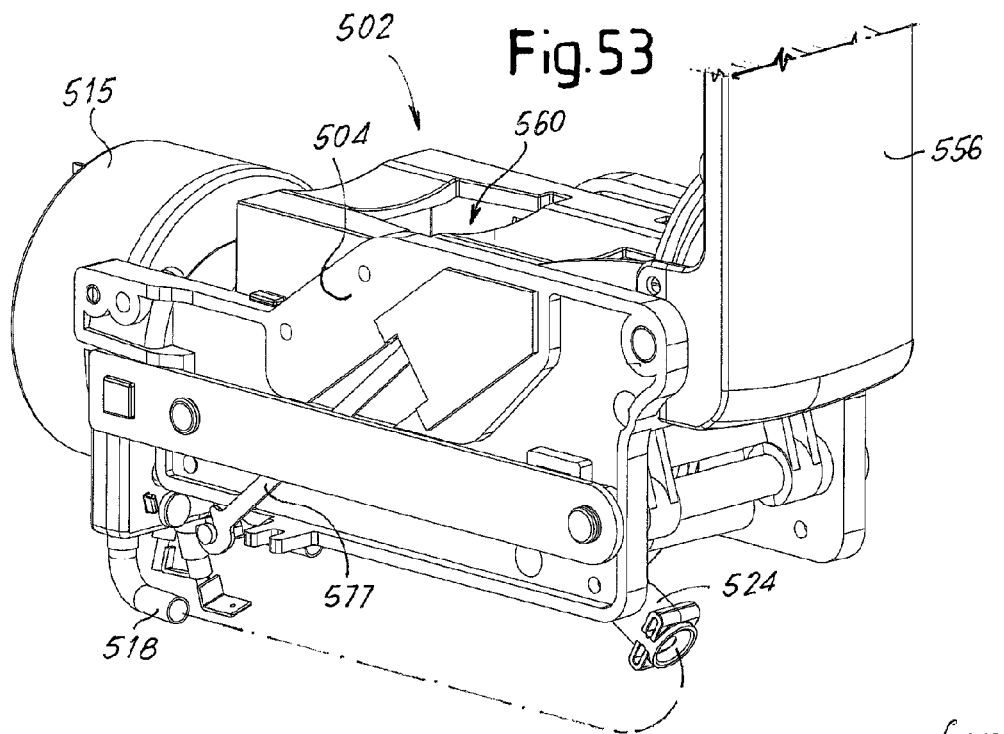
FIG. 53 shows a perspective view of a brewing unit in a further embodiment of the invention.

The operation of the brewing unit 502 described so far is as follows. In FIGS. 53, 54 the brewing unit 502 is open. A capsule C has been introduced by gravity into the brewing unit 502 through aperture 560 and has reached the rest position shown in FIG. 54, wherein the capsule is supported by the mobile deviator 563 and the movable capsule supporting member 571, clear of the brewing chamber portions 521, 523. The mobile deviator 563 and the movable capsule supporting member 571 are arranged in a position such that the capsule C, by meeting the mobile deviator 563, is deviated with the bottom thereof towards the brewing recess formed in the interior of the fixed brewing chamber portion 521, without getting into contact therewith. The capsule C is retained in this rest position until the brewing unit is closed acting on the control lever 556.

Figure 57:
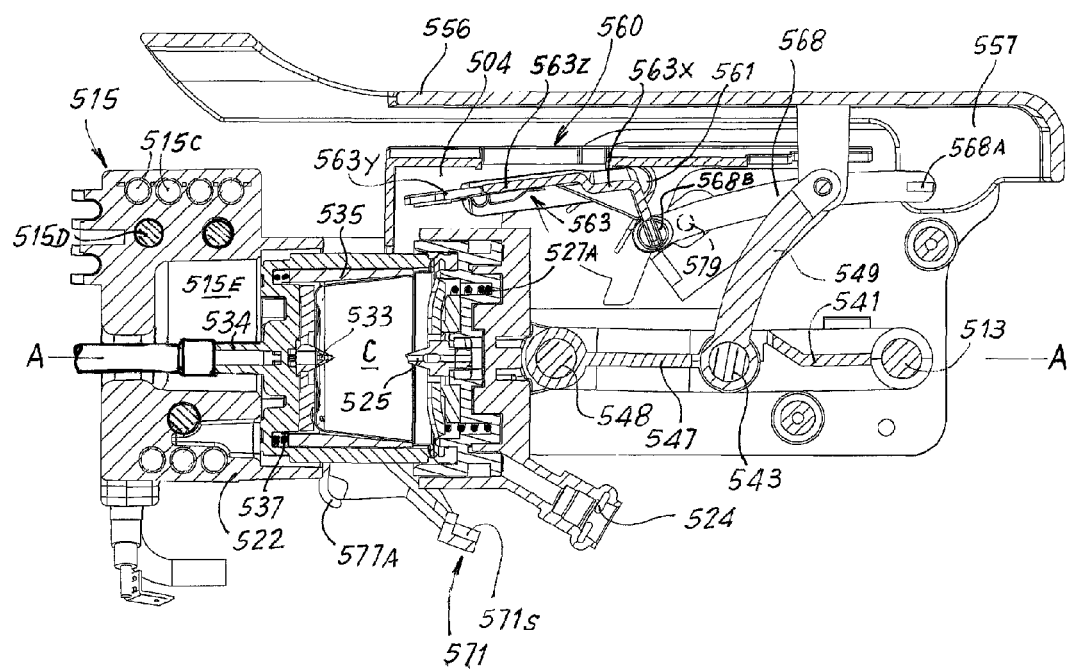

By actuating the control lever 556 downwards (arrow f556, FIG. 55), the brewing chamber is closed. The closing movement is shown in the sequence of FIGS. 55-57. During the closing motion the mobile deviator 563 is gradually lifted and clears the area where the mobile brewing chamber portion 523 moves. The lifting pivoting motion of the mobile deviator 563 is controlled by control lever 556 via rods 568. At the same time, the rods 577 cause the pivoting movement of the movable capsule supporting member 571. The pivoting movement of the movable supporting member 571 can be suitably delayed with respect to the movement of the control lever 556, such that the capsule C is properly supported with the flange F engaged by the seat 571S until the mobile deviator 563 has pushed the capsule into engagement with the fixed brewing chamber portion 521. This is best shown in FIG. 56, where the capsule C has been pushed by the mobile deviator 563 almost entirely inside the fixed brewing chamber portion 521, while the movable capsule supporting member 471 is still in its starting position. As shown in FIG. 57, the movable capsule supporting member 571 is then tilted downwards allowing closure of the brewing chamber.

To improve the capsule insertion into the fixed brewing chamber portion 521, in this embodiment the mobile deviator 563 is comprised of two portions 563X and 563Y hinged at 563Z around an axis parallel to the pivoting axis 568B. The portion 563Y is resiliently biased by a spring, e.g. a helical spring arranged around the hinge axis 563Z, such that the two portions 563X, 563Y are resiliently biased in an extended position. In some embodiments the two portions are resiliently biased in a co-planar position, as shown in FIGS. 54, 57. When the brewing unit is closed, the mobile deviator 563 pushes the capsule C towards the brewing recess in the fixed brewing chamber portion 521. The thrust exerted on the capsule causes the portion 563Y of the deviator 563 to pivot around the hinge axis 563Z, as best shown in the sequence of FIGS. 55-56 and indicated by arrow fy. This improves the operation of the mobile deviator and allows to arrange the rest position of the capsule C at an increased distance from the fixed brewing chamber portion 521, making the operation of the brewing unit more reliable.

In the closed position the flange F of the capsule C is sealingly engaged between the edge of the fixed brewing chamber portion 523 and the seal 529 of the mobile brewing chamber portion 523.

Once the brewing cycle has ended, with a reverse rotary motion of the control lever 556 the brewing chamber 521, 523 is opened again. The mobile deviator 563 is pushed downwards by the connection rods 568 such as to force downwards against the capsule C, in the event that the latter remains accidentally engaged to either one or the other of the two brewing chamber portions 521, 523. The capsule C is ejected or at least partially removed from the brewing recess in the fixed brewing chamber portion 521 by the elastic thrust exerted by the springs 537 on the hollow member 535, thus preventing the capsule C from remaining inside the fixed brewing chamber portion 521. The thrust exerted on the upper side on the capsule C by the mobile deviator 563 avoids that the capsule C remains attached to the mobile brewing chamber portion 523 or the fixed brewing chamber portion 521. The exhausted capsule C is thus reliably discharged by gravity. The movable capsule supporting member 571 is then moved again towards the starting position shown in FIG. 54 by control lever 556 via rods 577.

In other embodiments, not shown, the movable capsule supporting member can be arranged on the mobile deviator and acted upon by cams or other mechanical members arranged on both sides of the mobile deviator to de-activate and activate the movable capsule supporting member. In other embodiments the movable capsule supporting member can be arranged sideways of the mobile deviator and be acted upon by said deviator to be brought alternatively in an active position and in a cleared-off position. Also in these embodiments the movable capsule supporting member is controlled by the actuating mechanism, e.g. a manual lever, which also controls the movement of the mobile deviator and at least one of the brewing chamber portions, such that all the movable parts of the brewing unit are controlled in synchronism.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions.

The invention claimed is:

1. A brewing unit for preparing beverages from a pre-packed capsule, comprising:
  a brewing chamber comprising a first brewing chamber portion and a second brewing chamber portion, mobile one with respect to the other to open and close the brewing chamber;
  a channel for inserting said capsule downwards towards said brewing chamber;
  a mobile deviator interposing between said first brewing chamber portion and said second brewing chamber portion when said first brewing chamber portion and second brewing chamber portion are open, to deviate said capsule towards one of said first and second brewing chamber portions;
  an actuation mechanism for closing and opening said brewing chamber;
  a movable capsule supporting member comprising a supporting arm arranged and controlled to retain the capsule from below, so that when the brewing chamber is open said capsule is supported by said mobile deviator and said supporting arm;
  wherein: said actuation mechanism is connected to one of said first brewing chamber portion and said second brewing chamber portion to open and close said brewing chamber; said actuation mechanism is further connected to said mobile deviator and to said movable capsule supporting member such that said actuation mechanism controls both said mobile deviator and said movable capsule supporting member, to remove said mobile deviator and said supporting arm from said trajectory of mutual motion of said first and second brewing chamber portions during closure of the brewing chamber; said mobile deviator and said supporting arm are hinged to provide a rotation motion to either rotate said mobile deviator downwards and said supporting arm upwards to interpose between said first brewing chamber portion and said second brewing chamber portion when the brewing chamber is opened or to rotate said mobile deviator upwards and said supporting arm downwards out of the trajectory of said first and second brewing chamber portions under the control of said actuation mechanism when the brewing chamber is closed.

2. The brewing unit according to claim 1, wherein said mobile deviator is arranged to deviate said capsule towards a brewing recess formed in one of said first and second brewing chamber portions.

3. The brewing unit according to claim 1, wherein said insertion channel is directed generally in a vertical direction to insert said capsule by gravity.

4. The brewing unit according to claim 1, wherein the movement of the mobile deviator is controlled by said actuating mechanism through a kinematic connecting member.

5. The brewing unit according to claim 1, wherein said mobile deviator is returned in the position interposed between the first brewing chamber portion and the second brewing chamber portion by said actuation mechanism.

6. The brewing unit according to claim 1, wherein said mobile deviator is resiliently returned in the position interposed between the first brewing chamber portion and the second brewing chamber portion.

7. The brewing unit according to claim 1, wherein said mobile deviator comprises a chute which, when the brewing chamber is open, arranges between the first and the second brewing chamber portions in a position tilted from the top downwards and towards one of said first and second brewing chamber portions, and wherein said capsule coming from the insertion channel is guided by said chute.

8. The brewing unit according to claim 1, wherein one of said first brewing chamber portion and said second brewing chamber portion is mobile and the other one is fixed with respect to a bearing structure whereto said insertion channel is associated.

9. The brewing unit according to claim 8, wherein said mobile deviator is hinged to said bearing structure.

10. The brewing unit according to claim 1, wherein at least one of said first and second brewing chamber portions comprises an elastic ejector to eject an exhausted capsule and wherein said mobile deviator is provided with a motion according to a trajectory interfering with said capsule if said capsule remains adhering to any one of said first and second brewing chamber portions, thus causing detachment and removal of the capsule from the brewing chamber portion.

11. The brewing unit according to claim 1, wherein said actuation mechanism comprises a control lever for closing and opening the brewing chamber.

12. The brewing unit according to claim 11, wherein said control lever is connected to said mobile deviator, so that the motion of the control lever causes the closing and opening of the brewing chamber and motion of the mobile deviator synchronized with the motion of the first and second brewing chamber portions.

13. The brewing unit according to claim 1, wherein said first and said second brewing chamber portions move one with respect to the other according to a direction generally orthogonal to the direction of the insertion channel of the capsule.

14. The brewing unit according to claim 1, wherein said mobile deviator comprises two portions hinged to one another and resiliently biased in an extended position.

15. The brewing unit according to claim 14, wherein said two portions of the mobile deviator are hinged to one another about an axis parallel to a pivoting axis around which said mobile deviator rotates when removed from the trajectory of the brewing chamber portions, said two portions of the mobile deviator being forced to take a mutually inclined position by co-action with the capsule during closure of the brewing chamber.

16. A beverage producing machine, comprising a brewing unit according to claim 1.

17. The brewing unit according to claim 1, wherein said mobile deviator comprises a chute which, when the brewing chamber is open, arranges between the first and the second brewing chamber portions in a position tilted from the top downwards and towards one of said first and second brewing chamber portions, wherein the capsule coming from the insertion channel is guided by said chute and wherein during opening of the brewing chamber, the chute moves downwards pushing against said capsule and dislodging said capsule from the one of said first and second brewing chamber portions, thus causing detachment of the capsule from the one of said first and second brewing chamber portions.

18. The brewing unit according to claim 1, comprising a pin and a projection, wherein the rotation motion of said mobile deviator is provided by rotation of said mobile deviator about the pin and the projection pushing on and following a cam profile of said mobile deviator when the brewing chamber is opened and closed.

* * * * *